US012226746B2

(12) United States Patent
Nguyen et al.

(10) Patent No.: US 12,226,746 B2
(45) Date of Patent: Feb. 18, 2025

(54) REVERSING BIAS IN POLYMER SYNTHESIS ELECTRODE ARRAY

(71) Applicant: MICROSOFT TECHNOLOGY LICENSING, LLC, Redmond, WA (US)

(72) Inventors: Bichlien Nguyen, Seattle, WA (US); Karin Strauss, Seattle, WA (US); Gagan Gupta, Bellevue, WA (US); Richard Rouse, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 444 days.

(21) Appl. No.: 16/435,363

(22) Filed: Jun. 7, 2019

(65) Prior Publication Data
US 2020/0384434 A1 Dec. 10, 2020

(51) Int. Cl.
*B01J 19/00* (2006.01)

(52) U.S. Cl.
CPC ....... *B01J 19/0046* (2013.01); *B01J 19/0006* (2013.01); *B01J 2219/0018* (2013.01); *B01J 2219/00454* (2013.01); *B01J 2219/00596* (2013.01); *B01J 2219/00612* (2013.01); *B01J 2219/00626* (2013.01); *B01J 2219/00637* (2013.01); *B01J 2219/00653* (2013.01); *B01J 2219/00713* (2013.01); *B01J 2219/00722* (2013.01); *B01J 2219/00725* (2013.01)

(58) Field of Classification Search
None
See application file for complete search history.

(56) References Cited

U.S. PATENT DOCUMENTS

| | | | |
|---|---|---|---|
| 4,668,777 A | 5/1987 | Caruthers et al. | |
| 4,973,679 A | 11/1990 | Caruthers et al. | |
| 5,298,414 A | 3/1994 | Bruce | |
| 5,605,662 A | 2/1997 | Heller et al. | |
| 6,017,696 A | 1/2000 | Heller | |
| 6,051,380 A | 4/2000 | Sosnowski et al. | |
| 6,093,370 A | 7/2000 | Yasuda et al. | |
| 6,423,172 B1 | 7/2002 | Mcardle et al. | |
| 6,444,111 B1 | 9/2002 | Montgomery | |
| 6,451,191 B1 | 9/2002 | Bentsen et al. | |
| 6,610,479 B1 | 8/2003 | Lundeberg et al. | |
| 6,951,682 B1 | 10/2005 | Zebala | |
| 6,994,972 B2 | 2/2006 | Bardhan et al. | |
| 7,056,666 B2 | 6/2006 | Dower | |
| 7,115,531 B2 | 10/2006 | Shaffer et al. | |
| 7,172,864 B1 | 2/2007 | Heller et al. | |
| 7,268,200 B2 | 9/2007 | Townsend et al. | |
| 7,385,050 B2 | 6/2008 | Dellinger et al. | |
| 7,417,139 B2 | 8/2008 | Dellinger et al. | |
| 7,494,797 B2 | 2/2009 | Mueller et al. | |
| 8,053,774 B2 | 11/2011 | Dubin et al. | |
| 8,278,121 B2 | 10/2012 | Dubin et al. | |
| 8,697,605 B2 | 4/2014 | Gao et al. | |
| 8,940,143 B2 | 1/2015 | Dubin et al. | |
| 9,745,628 B2 | 8/2017 | Gao et al. | |
| 10,035,147 B2 | 7/2018 | Dubin et al. | |
| 10,059,929 B2 | 8/2018 | Efcavitch et al. | |
| 10,294,526 B2 | 5/2019 | Gao et al. | |
| 11,414,776 B2 | 8/2022 | Lin | |
| 11,584,956 B2 | 2/2023 | Strauss | |
| 2002/0052125 A1 | 5/2002 | Shaffer et al. | |
| 2002/0142339 A1 | 10/2002 | Bardhan et al. | |
| 2003/0059929 A1 | 3/2003 | Heller et al. | |
| 2004/0152085 A1 | 8/2004 | Terlesky et al. | |
| 2004/0238369 A1* | 12/2004 | Southern | C07H 21/00 205/122 |
| 2006/0046262 A1* | 3/2006 | Mauritz | B82Y 30/00 204/450 |
| 2006/0102471 A1 | 5/2006 | Maurer et al. | |

(Continued)

FOREIGN PATENT DOCUMENTS

EP 1629884 A1 3/2006
WO 0061282 A1 10/2000

(Continued)

OTHER PUBLICATIONS

Moore et al(Analytical Chemistry 79::2050-7) (Year: 2007).*
Kim et al(Journal of Biotechnology 151:319-24) (Year: 2011).*
Moore et al. "Selective Release of DNA from the Surface of Indium-Tin Oxide Thin Electrode Films Using Thiol-Disulfide Exchange Chemistry", Analytic Chemistry vol. 79, No. 5, pp. 2050-2057, published Mar. 1, 2007 (Year: 2007).*
"Notice of Allowance Issued in U.S. Appl. No. 16/597,799", Mailed Date: Dec. 21, 2021, 9 Pages.
"Final Office Action Issued in U.S. Appl. No. 16/597,799", Mailed Date: Jan. 11, 2021, 8 Pages.

(Continued)

*Primary Examiner* — Nancy J Leith
*Assistant Examiner* — Jessica D Parisi
(74) *Attorney, Agent, or Firm* — Benjamin Keim; Newport IP, LLC

(57) ABSTRACT

Polymers synthesized by solid-phase synthesis are selectively released from a solid support by reversing the bias of spatially addressable electrodes. Change in the current and voltage direction at one or more of the spatially addressable electrodes changes the ionic environment which triggers cleavage of linkers that leads to release of the attached polymers. The spatially addressable electrodes may be implemented as CMOS inverters embedded in an integrated circuit (IC). The IC may contain an array of many thousands of spatially addressable electrodes. Control circuity may independently reverse the bias on any of the individual electrodes in the array. This provides fine-grained control of which polymers are released from the solid support. Examples of polymers that may be synthesized on this type of array include oligonucleotides and peptides.

19 Claims, 10 Drawing Sheets

(56) References Cited

U.S. PATENT DOCUMENTS

| | | | |
|---|---|---|---|
| 2006/0194214 | A1 | 8/2006 | Church et al. |
| 2006/0275927 | A1 | 12/2006 | Dubin et al. |
| 2008/0070803 | A1 | 3/2008 | Egeland |
| 2009/0000957 | A1 | 1/2009 | Dubin et al. |
| 2009/0075840 | A1 | 3/2009 | Myerson et al. |
| 2009/0325817 | A1 | 12/2009 | Gao et al. |
| 2011/0092384 | A1 | 4/2011 | Kwon |
| 2012/0029056 | A1 | 2/2012 | Alevizos et al. |
| 2013/0098771 | A1* | 4/2013 | Emig .............. B01J 19/0046 205/340 |
| 2013/0281324 | A1 | 10/2013 | Gouliaev et al. |
| 2015/0203887 | A1 | 7/2015 | Lazinski et al. |
| 2018/0267032 | A1* | 9/2018 | Maurer ............. B01J 19/0046 |
| 2018/0274001 | A1 | 9/2018 | Efcavitch et al. |
| 2020/0199662 | A1* | 6/2020 | Strauss ............. B01J 19/0046 |
| 2020/0362394 | A1 | 11/2020 | Gawad et al. |
| 2021/0047669 | A1* | 2/2021 | Nguyen ............. C12Q 1/6874 |
| 2021/0071170 | A1* | 3/2021 | Nguyen ............... G16B 30/00 |
| 2021/0106967 | A1 | 4/2021 | Nguyen et al. |
| 2021/0238577 | A1 | 8/2021 | Nguyen et al. |
| 2022/0023820 | A1* | 1/2022 | Strauss ............... C25B 11/02 |
| 2022/0203324 | A1 | 6/2022 | Nguyen et al. |
| 2023/0151411 | A1 | 5/2023 | Strauss et al. |
| 2024/0408564 | A1 | 12/2024 | Nguyen |

FOREIGN PATENT DOCUMENTS

| | | | |
|---|---|---|---|
| WO | 02097112 | A2 | 12/2002 |
| WO | WO-2008051454 | A1 * | 5/2008 ............ C07H 21/00 |
| WO | 2017142913 | A1 | 8/2017 |
| WO | 2017156218 | A1 | 9/2017 |
| WO | 2017165438 | A1 | 9/2017 |
| WO | 2017176541 | A1 | 10/2017 |
| WO | 2017196783 | A1 | 11/2017 |
| WO | 2017223517 | A1 | 12/2017 |
| WO | 2018119253 | A1 | 6/2018 |
| WO | 2020131588 | A1 | 6/2020 |
| WO | 2020247090 | A1 | 12/2020 |

OTHER PUBLICATIONS

"Non Final Office Action Issued in U.S. Appl. No. 16/563,797", Mailed Date: Jan. 18, 2022, 22 Pages.

Hoang, et al., "Modification of 3' Terminal Ends of DNA and RNA Using DNA Polymerase 0 Terminal Transferase Activity", In Journal of Bio-Protocol, vol. 7, Issue 12, Jun. 20, 2017, pp. 1-9.

Vortler, et al., "tRNA-Nucleotidyltransferases: Highly Unusual RNA Polymerases with Vital Functions", In Journal of FEBS Letters, vol. 584, Issue 2, Jan. 21, 2010, pp. 297-302.

Thomas, et al., "One-Step Enzymatic Modification of RNA 3' Termini using Polymerase 0", In Journal of Nucleic Acids Research, vol. 47, Issue 7, Mar. 1, 2019, pp. 3272-3283.

Bi, et al., "Building Addressable Libraries: The Use of "Safety-Catch" Linkers on Microelectrode Arrays", In Journal of the American Chemical Society vol. 132, Issue 49, Nov. 19, 2010, pp. 17405-17407.

Egeland, et al., "Electrochemically Directed Synthesis of Oligonucleotides for DNA Microarray Fabrication", Published in Nucleic Acids Research, vol. 33, Issue 14, Aug. 5, 2005, pp. 1-7.

Hart, et al., "Synthesis and Characterization of trans-Dichlorotetrakis (imidazole)cobalt(III) Chloride: A New Cobalt(III) Coordination Complex with Potential Prodrug Properties", In Journal Bioinorganic Chemistry and Applications, vol. 2018, Article ID 4560757, Sep. 3, 2018, 7 Pages.

Heffern, et al., "Cobalt Derivatives as Promising Therapeutic Agents", In Journal Current opinion in chemical biology, vol. 17, Issue 2, 2013, pp. 189-196.

Lee, et al., "Terminator-free Template-independent Enzymatic DNA Synthesis for Digital Information Storage", Published in Nature Communications, vol. 10, Article No. 2383, Jun. 3, 2019, pp. 1-12.

Motea, et al., "Terminal Deoxynucleotidyl Transferase: The Story of a Misguided DNA Polymerase", Published in Biochimica et Biophysica Acta (BBA)—Proteins and Proteomics, vol. 1804, Issue 5, May 2010, pp. 1151-1166.

Palluk, et al., "De novo DNA Synthesis Using Polymerasenucleotide Conjugates", Published in Nature Biotechnology vol. 36, Issue 7, Jul. 2018, 24 Pages.

Richey, et al., "Mg Anode Corrosion in Aqueous Electrolytes and Implications for Mg-Air Batteries", In Journal of The Electrochemical Society, vol. 163, Issue 6, 2016, pp. A958-A963.

Shaw, et al., "Photoredox Catalysis in Organic Chemistry", In the Journal of Organic Chemistry, vol. 81, Issue 16, Aug. 1, 2016, pp. 6898-6926.

Kosuri, et al., "Large-Scale de Novo DNA Synthesis: Technologies and Applications", In Journal of Nature Methods, vol. 11, Issue 5, May 2014, pp. 499-507.

Zheng, et al., "A Redox-Sensitive Resin Linker for the Solid Phase Synthesis of C-Terminal Modified Peptides", In the Journal of Organic Chemistry, vol. 64, Dec. 9, 1998, Issue 1, pp. 156-161.

Devor, et al., "Strategies for Attaching Oligonucleotides to Solid Supports", Integrated DNA Technologies v6, 2014, pp. 1-22.

Rothstein, et al., "Solid-Phase Supports for Oligo Synthesis", Retrieved from: https://www.genengnews.com/magazine/181/solid-phase-supports-for-oligo-synthesis/4096/, Retrieved Date: Jun. 20, 2019, 08 Pages.

Sonawane, et al., "Surface Modification Chemistries of Materials Used in Diagnostic Platforms with Biomolecules", In Journal of Chemistry, vol. 2016, Article ID 9241378, May 25, 2016, pp. 1-19.

Zhang, et al., "DNA Molecules Site-Specific Immobilization and their Applications", In Central European Journal of Chemistry, vol. 12, Issue 10, Oct. 1, 2014, pp. 977-993.

"Non Final Office Action Issued in U.S. Appl. No. 16/597,799", Mailed Date: Sep. 20, 2021, 6 Pages.

Pirrung, Michael C. , "How to Make a DNA Chip", In Journal of Angewandte Chemie International Edition, vol. 41, Issue 8, Apr. 15, 2002, pp. 1277-1289.

"International Search Report and Written Opinion Issued in PCT Application No. PCT/US20/051345", Mailed Date: Dec. 9, 2020, 13 Pages.

"Non Final Office Action Issued in U.S. Appl. No. 16/597,799", Mailed Date: Mar. 19, 2021, 8 Pages.

"Non Final Office Action Issued in U.S. Appl. No. 16/597,799", Mailed Date: Jul. 17, 2020, 7 Pages.

Nguyen, et al., "Long-Term Stability and Integrity of Plasmid-Based DNA Data Storage", In Journal of the Polymers, vol. 10, Issue 1, Jan. 1, 2018, 10 Pages.

Organick, et al., "Random Access in Large-Scale DNA Data Storage", In Journal of the Nature Biotechnology, vol. 36, Issue No. 3, Mar. 2018, pp. 242-248.

"International Search Report and Written Opinion Issued in PCT Application No. PCT/US20/037104", Mailed Date: Sep. 28, 2020, 10 Pages.

"International Search Report and Written Opinion Issued in PCT Application No. PCT/US20/038020", Mailed Date: Sep. 21, 2020, 12 Pages.

"Final Office Action Issued in U.S. Appl. No. 16/230,787", Mailed Date: Aug. 18, 2021, 14 Pages.

"Non Final Office Action Issued in U.S. Appl. No. 16/230,787", Mailed Date: Feb. 24, 2021, 7 Pages.

"Non Final Office Action Issued in U.S. Appl. No. 16/230,787", Mailed Date: Mar. 17, 2022, 19 Pages.

Francke, et al., "Redox Catalysis in Organic Electrosynthesis: Basic Principles and Recent Developments", In Journal of Chemical Society Reviews, vol. 43, No. 8, Apr. 21, 2014, pp. 2492-2521.

"International Search Report and Written Opinion Issued in PCT Application No. PCT/US2019/066106", Mailed Date: Feb. 20, 2020, 13 Pages.

Terrett, Nicholas K., "Solid Phase Library Chemistry", In Journal of Combinatorial Chemistry, 1998, pp. 125-126.

Usui, et al., "A Cell Microarray Format: A Peptide Release System Using a Photo-Cleavable Linker for Cell Toxicity and Cell Uptake Analysis", In Publication of Humana Press, 2016, pp. 199-210.

(56) References Cited

OTHER PUBLICATIONS

"Non Final Office Action Issued in U.S. Appl. No. 16/543,433", Mailed Date: May 27, 2022, 9 Pages.
"Final Office Action Issued in U.S. Appl. No. 16/230,787", Mailed Date: Jul. 28, 2022, 19 Pages.
"Final Office Action Issued in U.S. Appl. No. 16/563,797", Mailed Date: Jun. 27, 2022, 22 Pages.
Atrash, et al., "A pH Cleavable Linker for Zone Diffusion Assays and Single Bead Solution Screens in Combinatorial Chemistry", In Journal of Chemical Communications, vol. 15, Jan. 1, 1997, pp. 1397-1398.
Routledge, et al., "The Use of a Dithiane Protected Benzoin Photolabile Safety Catch Linker for Solid-Phase Synthesis", In Journal of Tetrahedron letters, vol. 38, Issue 7, Feb. 17, 1997, pp. 1227-1230.
Russell, et al., "Thermally Cleavable Safety-catch Linkers for Solid Phase Chemistry", In Journal of Tetrahedron Letters, vol. 41, Issue 27, Jul. 1, 2000, pp. 5287-5290.
"Notice of Allowance Issued in U.S. Appl. No. 16/230,787", Mailed Date: Oct. 24, 2022, 11 Pages.
"Non Final Office Action Issued in U.S. Appl. No. 16/597,799", Mailed Date: Aug. 18, 2022, 5 Pages.
"Non Final Office Action Issued in U.S. Appl. No. 17/695,734", Mailed Date: Oct. 18, 2022, 10 Pages.
"Notice of Allowance Issued in U.S. Appl. No. 16/597,799", Mailed Date: Nov. 9, 2022, 8 Pages.
"Notice of Allowance Issued in U.S. Appl. No. 16/543,433", Mailed Date: Mar. 29, 2023, 7 Pages.
"Non Final Office Action Issued in U.S. Appl. No. 17/815,380", Mailed Date: Mar. 9, 2023, 8 Pages.
"Notice of Allowance Issued in U.S. Appl. No. 16/543,433", Mailed Date: Apr. 14, 2023, 6 Pages.
"Non Final Office Action Issued in U.S. Appl. No. 16/597,799", Mailed Date: Apr. 6, 2023, 7 Pages.
"International Search Report and Written Opinion Issued in PCT Application No. PCT/US2020/029180", Mailed Date: Jul. 16, 2020, 10 Pages.
"Notice of Allowance Issued in U.S. Appl. No. 16/543,433", Mailed Date: Feb. 8, 2023, 8 Pages.
"Final Office Action Issued in U.S. Appl. No. 17/695,734", Mailed Date: Feb. 9, 2023, 9 Pages.
"International Search Report and Written Opinion Issued in PCT Application No. PCT/US22/042409", Mailed Date: Feb. 23, 2023, 9 Pages.
"Notice of Allowance Issued in U.S. Appl. No. 16/597,799", Mailed Date: Sep. 29, 2023, 9 Pages.
"Notice of Allowance Issued in U.S. Appl. No. 16/563,797", Mailed Date: Jun. 16, 2023, 9 Pages.
"Non-Final Office Action Issued in U.S. Appl. No. 17/815,380", Mailed Date: Dec. 1, 2023, 9 Pages.
Corrected Notice of Allowability mailed on May 3, 2024, in U.S. Appl. No. 17/815,380, 7 pages.
Notice of Allowance mailed on May 30, 2024, in U.S. Appl. No. 17/695,734, 08 pages.
Non-Final Office Action mailed on Aug. 23, 2024, in U.S. Appl. No. 18,221,364, 13 pages.
Notice of Allowance mailed on Aug. 19, 2024, in U.S. Appl. No. 18/156,511, 11 pages.
Wu et al., "Molecular hydrogelators of peptoid—peptide conjugates with superior stability against enzyme digestion" Nanoscale vol. 4, 2012, pp. 3644-3646.
Communication pursuant to Article 94(3) received in European Application No. 19842441.8, mailed on Oct. 16, 2024, 8 pages.
Communication pursuant to Article 94(3) Received in European Patent Application No. 2075319.6, mailed on Sep. 24, 2024, 4 pages.
Langston, Jennifer, "UW, Microsoft researchers break record for DNA data storage", Retrieved from the URL: https://www.washington.edu/news/2016/07/07/uw-microsoftresearchers-break-record-for-dna-data-storage/, Jul. 7, 2016, 5 Pages.
Communication pursuant to Artlce 94(3) Received in European Patent Application No. 20792779.9, mailed on Nov. 19, 2024, 4 pages.
Unpublished U.S. Appl. No. 18/950,630 entitled "Selectively Controllable Cleavable Linkers,", filed Nov. 18, 2024, 41 pages.
Egeland, et al., "An Electrochemical Redox Couple Activated by Microelectrodes for Confined Chemical Patterning of Surfaces" Analytical Chemistry, vol. 74, 2002, pp. 1590-1596.
Non-Final Office Action mailed on Dec. 12, 2024, in U.S. Appl. No. 17/494,320, 18 pages.

* cited by examiner

REVERSING BIAS IN POLYMER SYNTHESIS ELECTRODE ARRAY

BACKGROUND

Polymer synthesis is used to manufacture polymers with pre-determined sequences. Techniques for artificially synthesizing polymers typically use an additive process in which monomer subunits are sequentially joined to build the polymeric molecules. Many different types of polymers can be artificially synthesized. Examples include biological polymers such as oligonucleotides and peptides. One synthetic technique that is suitable for biological polymers, as well as other types of polymers, is solid-phase synthesis. During solid-phase synthesis the polymers are attached by linkers to a solid support. The solid support may be a microbead resin or a flat surface. After synthesis is complete, the polymers are typically separated from the solid support by chemical cleavage of the linkers. The polymers are then collected and may be purified, concentrated, or otherwise processed.

The systems and equipment used to artificially synthesize polymers, such as oligonucleotide synthesizers and automatic peptide synthesizers, generate the polymers in discrete batches. Each "run" or round of operation of a synthesizer manufactures a batch of polymers and releases the entire batch from the solid support once synthesis is complete. The synthesizer is then available to synthesize another batch of polymers. However, there may be circumstances in which the capacity of a synthesizer—the size of a batch—is not optimal. There may also be advantageous operational techniques that cannot be implemented if polymers are synthesized in discrete batches. Increased operational flexibility of synthesizers would allow improved and expanded techniques for polymer synthesis.

SUMMARY

This disclosure provides methods and devices for cleaving only some of the polymers from a solid support by selectively reversing the bias to one or more electrodes in an array of spatially addressable electrodes. Reversing the bias of an electrode changes the availability of ions in an electrolyte solution at the electrode. This, in turn, changes the type of reduction-oxidation (redox) reactions that can occur at the electrode. Redox reactions are then able to cleave a linker molecule that attaches the polymer to the substrate. Thus, by reversing the bias at specific electrodes in the array, polymers are selectively cleaved from the surface of the solid support. Synthesizing polymers on such a surface that includes independently- and spatially addressable electrodes allows for site-selective cleavage of linkers to release the polymers and enables new ways of using synthesizers.

Linkers are relatively short molecules that covalently attach the polymers to the solid support. One end of a linker attaches to the surface of the solid support and the other end attaches to a monomer on an end of the polymer. The linkers may be electrochemically cleavable linkers that are cleaved by addition of electrons to a bond in the linker. The electrons are generated by reversing the bias of an electrode at or near the location where the linker is attached to the solid support.

The array of spatially addressable electrodes contains many small electrodes, "microelectrodes," closely packed together and is referred to herein as an "electrode array" or simply "array." The electrodes of the array are embedded in the solid support on which the polymers are synthesized. The solid support may be an integrated circuit (IC) constructed using complementary metal-oxide-semiconductor (CMOS) technology. The CMOS may include metal-oxide-semiconductor field-effect transistors (MOSFETs) made through a triple-well process or by a silicon-on-insulator (SOI) process.

The voltage and current of individual electrodes in the array are reversed as referenced to an external electrode. For example, a positively charged anode may be switched to a negatively charged cathode to release a polymer. The external electrode may be a counter electrode that is physically separate from the solid support. This is referred to as an "off-array" electrode. Alternatively, the external electrode may be an "on-array" electrode that is part of the IC. In some implementations, the system may include both an on-array electrode and one or more off-array electrodes such as in three electrode or four electrode systems.

The electrode array may have noble metal contacts. The noble metal is unreactive and not damaged by reagents used during polymer synthesis. The electrode contacts may be coated or uncoated. If coated, the surface of the solid support, for example the noble metal electrode contacts, may be modified or functionalized for attachment of linkers. Functionalization provides a molecular structure for attachment of the linkers by a chemical reaction Solid-phase polymer synthesis on the type of electrode array described in this disclosure allows for arbitrary release of some but not all of the polymers synthesized in a single batch. This functionality may be used to separately release and isolate groups of polymers from a batch based on the location of attachment to the solid support. It may also be used to perform "pipelining" in which a series of polymers are synthesized at the same location independently of synthesis of other polymers on the same solid support. Each polymer synthesized in a pipeline can be released when synthesis is completed without waiting for synthesis of every polymer in the batch to finish.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. The term "techniques," for instance, may refer to system(s) and/or method(s) as permitted by the context described above and throughout the document.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
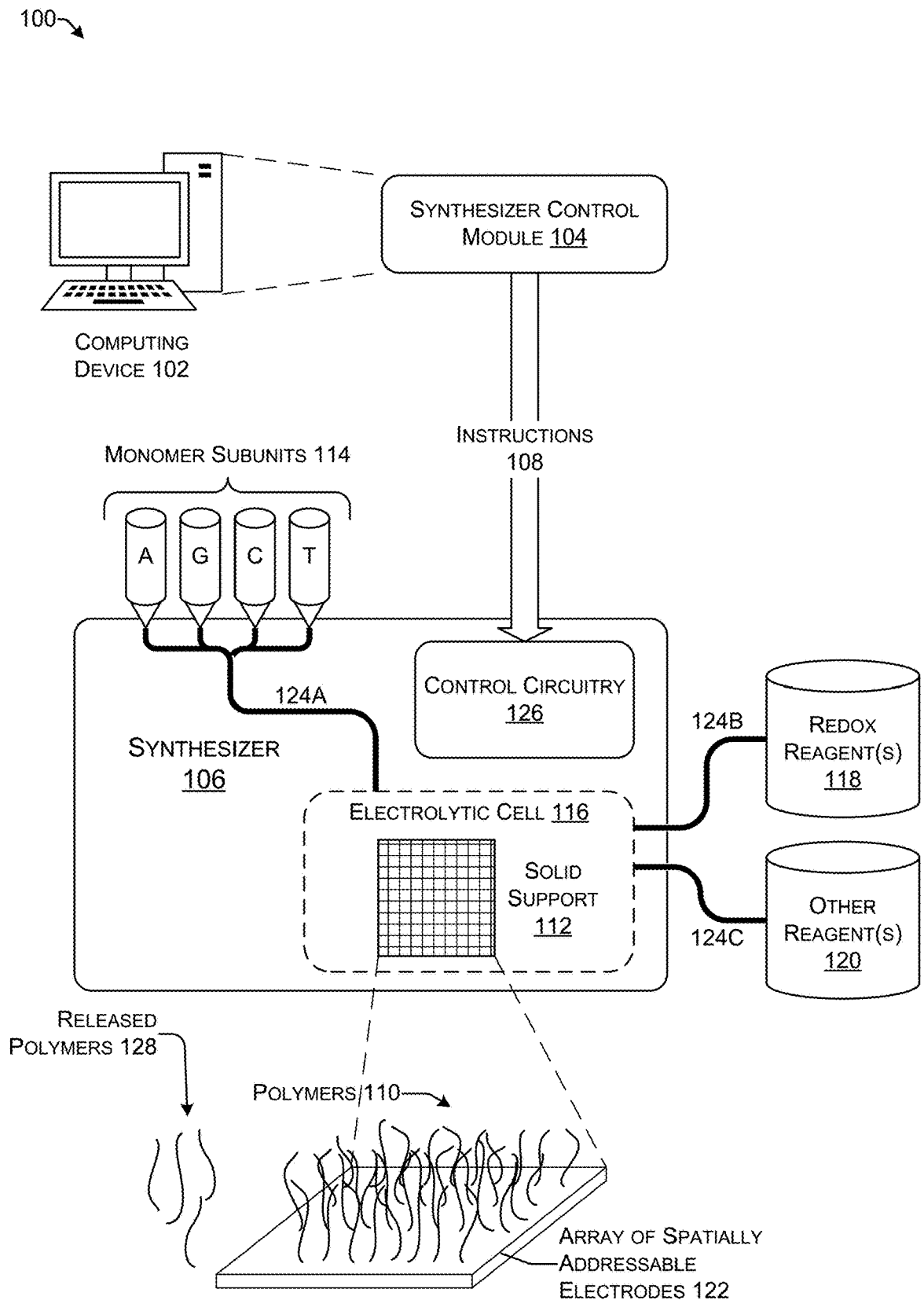
FIG. 1 is an architecture of a system for synthesizing polymers on a solid support that includes an array of spatially addressable electrodes.

This disclosure provides techniques, devices, and systems for using spatially addressable electrodes to selectively release polymers from a solid support on which the polymers are synthesized. Electrodes are embedded in the solid support and reversing the bias of the electrodes results in a change in the ionic environment on the surface of the solid support in proximity to the electrode. This change in the ionic environment can directly or indirectly cause cleavage of linkers that attach the polymers to the solid support.

The solid support is a platform for solid-phase synthesis. Solid-phase synthesis is a method in which molecules are covalently bound on a solid support material and synthesized step-by-step in a single reaction vessel. Solid-phase synthesis as described in this disclosure is performed on solid support that is an integrated circuit (IC) or "chip." Solid phase synthesis may be used to make many types of polymers including, but not limited to, oligonucleotides and peptides. "Polymer," as used herein is not limited to biological polymers but refers to any type of polymeric molecule that may be created with electrochemistry.

Solid-phase synthesis of oligonucleotides commonly uses the phosphoramidite method which combines phosphoramidite building blocks in the presence of a tetrazole catalyst. Nucleoside phosphoramidites are derivatives of natural or synthetic nucleosides. A phosphoramidite is a normal nucleotide with protecting groups, such as a trityl group, added to its reactive amine, hydroxyl, and phosphate groups. These protecting groups prevent unwanted side reactions and force the formation of the desired product during synthesis. Synthesis begins with a single phosphoramidite tethered to a solid support by a linker such as a succinyl linker coupled to a long chain alkylamine spacer.

Oligonucleotides, also referred to as polynucleotides, include both deoxyribose nucleic acid (DNA), ribonucleic acid (RNA), and hybrids containing mixtures of DNA and RNA. DNA includes nucleotides with one of the four natural bases cytosine (C), guanine (G), adenine (A), or thymine (T) as well as unnatural bases, noncanonical bases, and modified bases. RNA includes nucleotides with one of the four natural bases cytosine, guanine, adenine, or uracil (U) as well as unnatural bases, noncanonical bases, and modified bases.

The phosphoramidite method uses a cycle of four different chemistry mixtures to add each individual nucleoside in a 3' to 5' synthesis direction. First, a dimethoxytrityl (DMT)-protected nucleoside phosphoramidite that is attached to a solid support is deprotected by removal of the DMT using trichloroacetic acid (TCA) in a deblocking step. This reveals a free 5'-hydroxyl group. Second, in an activation step, a new DMT-protected phosphoramidite is coupled to the 5'-hydroxyl group of the growing oligonucleotide chain to form a phosphite triester. Third, a capping step acetylates any remaining unreacted 5' hydroxyl groups, making the unreacted oligonucleotide chains inert to further nucleoside additions and preventing one source of base deletions. Capping is accomplished by adding an acetylating reagent composed of acetic anhydride and N-methyl imidazole. This reagent reacts only with free hydroxyl groups to irreversibly cap the oligonucleotides in which coupling failed. Fourth, iodine oxidation converts the phosphite to a phosphate, producing a cyanoethyl-protected phosphate backbone stabilizing the phosphate linkage between the monomers in the growing oligonucleotide chain. The DMT protecting group is removed to allow the cycle to continue and add the next nucleoside.

The protection of the exocyclic amino groups on adenine, cytosine, and guanine is orthogonal to that of the 5'-hydroxy group because the DMT is removed at the end of each synthetic cycle. One technique is to use base-labile protecting groups on the exocyclic amino groups to create orthogonality with the TCA cleavage of the DMT protecting group.

After synthesis is complete, all the protecting groups are removed, and the single-stranded oligonucleotide is cleaved from the solid support. Coupling to the solid support is achieved by covalently attaching non-nucleoside linkers to the surface of the solid support. A phosphoramidite at the 3'-terminal nucleoside residue is coupled to the linker in the first synthetic cycle of oligonucleotide chain assembly using the standard protocols. These non-nucleoside linkers are typically cleaved by using a mixture of bases such as gaseous ammonia, aqueous ammonium hydroxide, and aqueous methylamine. Elevated temperature and pressure may also be used to promote cleavage. These cleavage techniques result in simultaneous cleavage of all linkers and release of all attached oligonucleotides.

The phosphoramidite method has been adapted for use in semiconductor-based oligonucleotide synthesis using microarrays. Microarrays contain an array of microelectrodes. Microarray-based synthesizers typically synthesize oligonucleotides at femtomolar synthesis scales which is lower than column-based synthesis. In addition to the reduced synthesis scale, chip-based oligonucleotide synthesizers offer levels of multiplexing not possible on traditional column-based synthesizers. This makes it possible for a greater number of unique oligonucleotide sequences (e.g., 10,000, 60,000, 90,000) to be synthesized in a given synthesis run. This high level of multiplexing is made possible in part by the microelectrode density which may be approximately 1000 microelectrodes/cm$^2$, 10,000 microelectrodes/cm$^2$, or a different density. One example of a microelectrode array is provided in Bo Bi et al., *Building Addressable Libraries: The Use of "Safety-Catch" Linkers on Microelectrode Arrays*, 132 J. Am. Chem. Soc. 17,405 (2010).

Oligonucleotides may also be syntheses by enzymatic techniques. Enzymatic synthesis of DNA currently uses a template-independent DNA polymerase, terminal deoxynucleotidyl transferase (TdT), which is a protein that evolved to rapidly catalyze the linkage of naturally occurring dNTPs. TdT adds nucleotides indiscriminately so it is stopped from continuing unregulated synthesis by various techniques such a tethering the TdT, creating variant enzymes, and using nucleotides that include reversible terminators to prevent chain elongation. Enzymatic synthesis may potentially create longer oligonucleotides than the phosphoramidite method and do so in an aqueous solution thus reducing the toxic waste stream. Details of one technique for enzymatic synthesis of oligonucleotides are provided in U.S. Pat. No. 10,059,929.

Solid-phase synthesis of peptides (SPPS) is another technique for polymer synthesis that uses solid supports. Peptide synthesis is the production of peptides, also referred to as polypeptides or proteins, where multiple amino acids are linked via amide bonds also known as peptide bonds. Amino acids as used herein includes all 20 standard amino acids, all 22 natural amino acids, non-proteinogenic amino acids, and D-isomers. Peptides are chemically synthesized by the condensation reaction of the carboxyl group of one amino acid to the amino group of another. Protecting group strategies are usually necessary to prevent undesirable side reactions with the various amino acid side chains. Chemical peptide synthesis most commonly starts at the carboxyl end of the peptide (C-terminus) and proceeds toward the amino-terminus (N-terminus).

SPPS allows the rapid assembly of a peptide chain through successive reactions of amino acid derivatives on an insoluble porous support. The general SPPS procedure is one of repeated cycles of alternate N-terminal deprotection and coupling reactions. First, an amino acid is linked to the solid support with a covalent bond between the carbonyl group of the amino acid and solid support. The bond coupling the amino acid to the solid support may be an amido or an ester bond. Subsequently, the amine is deprotected and then coupled with the free acid of the second amino acid. This cycle repeats until the desired sequence has been synthesized. SPPS cycles may also include capping steps which block the ends of unreacted amino acids from reacting. The protecting groups for the amino groups used in peptide synthesis are fluorenylmethyloxycarbonyl group (Fmoc) and tert-butyloxycarbonyl (Boc). Reactive side chains of amino acids are also protected with protecting groups that are orthogonal to the protecting group used for the amino group. At the end of the synthesis, all peptides are cleaved from the solid support while simultaneously removing all protecting groups using a strong acid such as trifluoroacetic acid or a nucleophile.

FIG. 1 shows an illustrative architecture 100 of a system for implementing aspects of this disclosure. The architecture 100 may include a computing device 102 with a synthesizer control module 104 that is communicatively connected to a synthesizer 106. The synthesizer control module 104 may provide instructions 108 that control operation of the synthesizer 106. The computing device 102 may be implemented as any type of conventional computing device such as a desktop computer, a laptop computer, a server, a hand-held device, or the like. In an implementation, the computing device 102 may be a part of the synthesizer 106 rather than a separate device.

The synthesizer 106 is a device that performs automated, chemical assembly of polymers 110 with a solid-phase process that assembles the polymers on a solid support 112. The synthesizer 106 may be specialized for synthesizing a particular type or class of polymers. For example, oligonucleotide synthesizers are used to synthesize DNA and RNA. Monomer subunits 114 are provided by the synthesizer 106 in a specified order for incorporation into the growing polymers 110. If synthesizing DNA, for example, the monomer subunits 114 may be nucleosides that include one of natural bases adenine (A), guanine (G), cytosine (C), or thymine (T).

The solid support 112 may be housed within an electrolytic cell 116. The electrolytic cell 116 may include an electrolyte solution which contains ions, atoms or molecules that have lost or gained electrons and is electrically conductive. The synthesizer 106 may also supply one or more types of redox reagents 118 and/or one or more types of other reagents 120 to the solid support 112 within the electrolytic cell 116. The redox reagent(s) 118 are reagents that cleave linkers under ionic conditions that can be created by activating electrodes in an array of the spatially addressable electrodes 122 embedded within the solid support 112. The other reagent(s) 120 may include reagents used for polymer synthesis such as the reagents described above for use in oligonucleotide synthesis or in peptide synthesis.

The monomer subunits 114, redox reagent(s) 118, and other reagent(s) may be moved into the electrolytic cell 116, and thus into contact with the solid support 112, through fluid delivery pathways 124A, 124B, and 124C respectively. The fluid delivery pathways 124 may be implemented by tubes and pumps, microfluidics, laboratory robotics, or other techniques.

The solid support 112 may be silicon chip or integrated circuit that has a generally flat, two-dimensional surface on which the polymers 110 can be synthesized. The surface of the solid support 112 may be modified or functionalized to make it possible to attach linkers.

The array of spatially addressable electrodes 122 embedded in the solid support 112 may be implemented using CMOS integrated circuits. CMOS circuits use a combination of p-type and n-type MOSFETs to implement logic gates and other digital circuits. In an implementation, the CMOS circuits may be inverters. A CMOS chip may contain billions of transistors of both p-type and n-type on a square or generally rectangular piece of semiconducting material such as silicon. In some implementations, the size of the chip may be between about 10 and 400 $mm^2$. A series of controllable gates/transistors implemented with CMOS circuits can be controlled by control circuitry 126 to inject charge at any location on the surface of the solid support. The control circuitry 126 is able to reverse the charge at any (or all) of the electrodes in the array of spatially addressable electrodes 122 in any arbitrary pattern specified in the instructions 108 provided by the synthesizer control module 104. Reversing the charge at an electrode in the array of spatially addressable electrodes 122 directly or indirectly results in cleavage of linkers holding the polymers 110 creating released polymers 128. The released polymers 128 are then present in the electrolyte solution covering the solid support 112. The released polymers 128 may be washed from the solid support 112, leaving the other polymers 110 still attached, and purified or isolated using conventional techniques.

Figure 2:
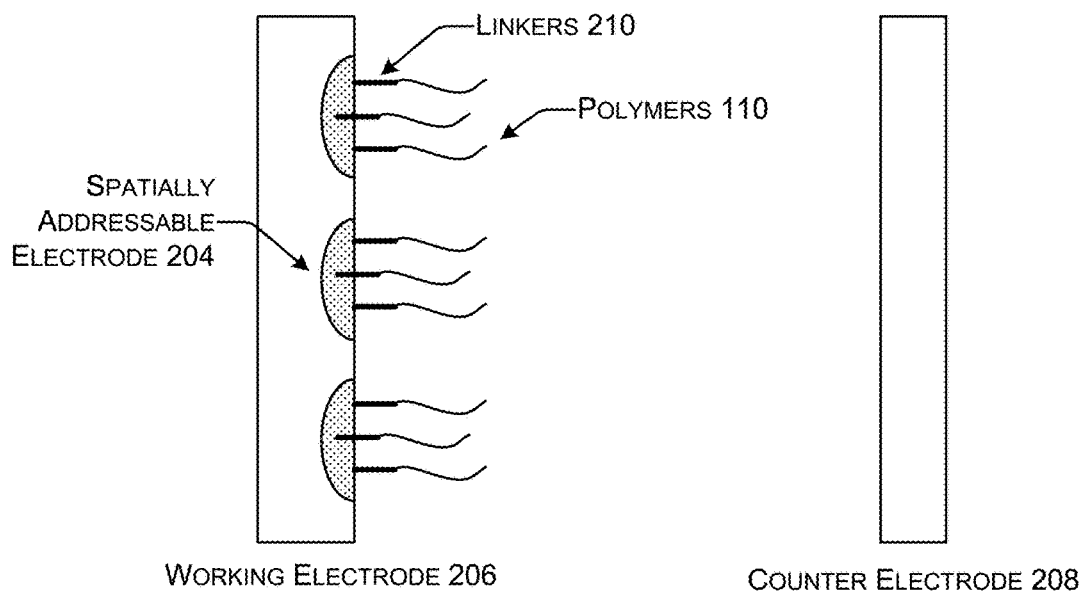
FIG. 2 illustrates two views of an electrolytic cell for polymer synthesis with spatially addressable electrodes. The two views show the release of polymers after the polarity of one of the spatially addressable electrodes is reversed.
Figure 2:
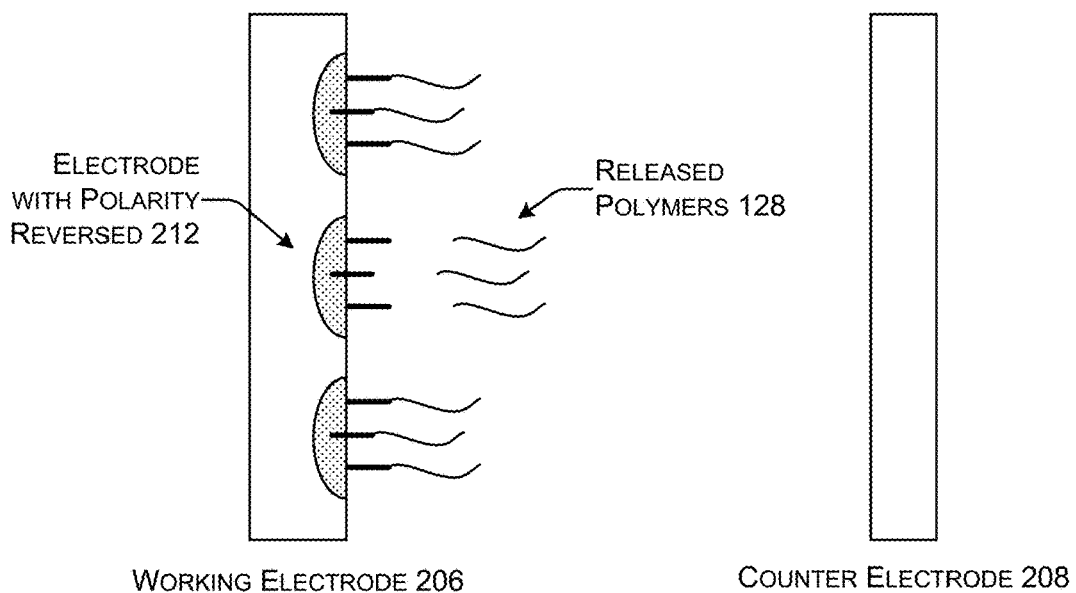

FIG. 2 illustrates a first view 200 of an electrolytic cell in which polymer synthesis occurs and a second view 202 of the electrolytic cell in which with the polarity of a spatially addressable electrode 204 is reversed. The electrolytic cell may be the electrolytic cell 116 shown in FIG. 1. The spatially addressable electrode 204 represents a single electrode within the array of spatially addressable electrodes 122. The array may include many thousands or many tens of thousands of individual electrodes.

The array of spatially addressable electrodes 122 are referred to as the working electrodes 206. The working electrodes 206 are those electrodes that are attached to the linkers 210 and polymers 110. Typically during synthesis, the working electrodes 206 function as anodes with a positive charge. A counter electrode 208 is thus the cathode for the electrolytic cell. In an implementation, the counter electrode 208 is an off-array electrode which may be formed from a metal such as palladium or platinum. The counter electrode 208 may alternatively be implemented as an on-array electrode in which this electrode is built onto or included in the solid support 112 that holds the array of spatially addressable electrodes 122. The electrochemical relationship between the counter electrode 208 and the working electrode 206 is the same regardless of the implementation of the counter electrode 208 as an on-array or off-array electrode. However, integration of the counter electrode 208 into the solid support 112 provides a more compact design.

The polymers 110 are attached to linkers 210 which in turn are bound to the surface of a spatially addressable electrode 204. An individual monomer of each of the attached polymers 110 is connected to a linker 210. The monomer may be referred to as an anchored monomer. The anchored monomer may have a covalent connection to the linker 210.

The linkers 210 are attached to the surface of the spatially addressable electrode 204 by a reaction that forms a covalent bond between the linkers and the electrode itself or coating on the surface of the electrode. In an implementation, linkers may be attached by an ester or amide linkage. Techniques for attaching linkers to substrates, such as ester chemistry for attaching the linker to a surface, are well-known to those having ordinary skill in the art. Standard techniques for solid-phase synthesis of oligonucleotides or polypeptides may be adapted for attachment of any of the linkers 210. The spatially addressable electrode 204 may be attached to multiple linkers 210 that may, in turn, each bind a single polymer 110. The resolution of the array of spatially addressable electrodes 122 is at the level of individual electrodes, so all linkers 210 that are attached to the same spatially addressable electrode 204 will be cleaved at the same time.

Reversing the voltage at the spatially addressable 204 results in an electrode with polarity reversed 212. Each spatially addressable electrode 204 in the array of spatially addressable electrodes 122 may be independently addressed allowing the creation of arbitrary and variable voltage microenvironments across the surface of the solid support 112. Oxidation of the electrolyte solution covering the surface of the solid support 112 after reversal of current to the spatially addressable electrode 204 liberates acid at the anodes; concomitant reduction at the cathodes consumes acid. The ions and radicals generated by these redox reactions at the electrode surfaces move away from the electrodes through a combination of diffusion, migration and convection effects. Products formed at the electrodes may further react. Once primary or secondary products reach the surface of the array of spatially addressable electrodes 122, they may react by cleaving the linkers 210. Redox reactions include, for example, chemical reactions that result in a change of pH. The change in pH may be used to cleave acid labile linkers or base labile linkers. One illustrative type of bond that can be cleaved by a redox reaction is an ester that forms a carbonyl group. The redox reactions lead to localized cleavage of linkers 210 either directly or by enabling a redox reagent 118 to cleave the linkers 210. Thus, the release of polymers 110 is limited to only those electrodes with the polarity reversed 212.

The linkers 210 may be electrochemically cleavable linkers that include at least one electrochemically cleavable bond which is cleaved by oxidation/reduction caused by activating the spatially addressable electrode 204. This provides site-selective polymer release leading to selected groups of released polymers 128 as shown in the second view 202.

This may be referred to as a "directly mediated cleavage" in which the reversing polarity of the spatially addressable electrode 204 results in the electrode with polarity reversed 212 and directly causes cleavage of a bond in the linker 210. Electrochemically cleavable linkers may include an ester or an amide linkage and a protected alcohol or amine that when released can trigger an inter-molecular cyclization reaction onto the ester or amide to form a lactone or lactam, thereby cleaving the linker and generating a leaving group. Examples of some suitable linkers can be found in U.S. patent application Ser. No. 16/230,787 filed on Dec. 21, 2018, with the title "Selectively Controllable Cleavable Linkers."

Another technique for inducing cleavage due to change in the polarity of a spatially addressable electrode 204 is referred to as "indirectly mediated cleavage." With indirectly mediated cleavage, the electrode with polarity reversed 212 activates a redox reagent 118 which in turn causes cleavage of a bond in the linker 210. For example, the redox reagent 118 may be hydroquinone which generates acid at an anode or carbon dioxide ($CO_2$) which can generate formic acid at the cathode. Acid generated by the hydroquinone, carbon dioxide, or other redox reagent 118 may cleave acid cleavable linkers thereby releasing the polymers 110.

Numerous acid cleavable linkers are known to those of ordinary skill in the art such as orthoester, acetal, β-thio-propionate, ketal, phosphoramidate, hydrazone, vinyl ether, imine, aconityl, trityl, and polyketal linkers. Examples of acid cleavable linkers are provided in Leriche, G.; Chisholm, L., Wagner, A. "Cleavable linkers in chemical biology." Bioorganic & Medicinal Chemistry. 2012, 20, 2, pp. 571-582. The redox reagent 118 such as hydroquinone may in contact with the entire surface of the array of spatially addressable electrodes 122. However, hydroquinone is oxidized and forms acid only in proximity to those electrodes that are anodes such as the electrode with polarity reversed 212 shown in FIG. 2. The acid then cleaves linkers 210 bound to that anode without affecting the linkers bound to other electrodes.

Another technique for cleaving the linkers 210 is oxidative cleavage at an anode by generating the chemical reagent at the electrode. For example, sodium periodate ($NaIO_4$) generated at an anode can cleave vicinal diols or selenium linkers such as selenodiacetic acid diester. In a vicinal diol, also called a glycol, two hydroxyl groups occupy vicinal positions, that is, they are attached to adjacent atoms. Examples include 1,2-ethanediol or ethylene glycol HO—$(CH_2)_2$—OH and propane-1,2-diol, or alpha propylene glycol, HO—$CH_2$—CH(OH)—$CH_3$. As a further example, palladium catalyzed deallylation of allylic esters results in cleavage of the allelic ester at the anode. The above techniques illustrate various redox reagents 118 that may be used to achieve site-selective release of the polymers 110 from the surface of the solid support 112.

Figure 3:
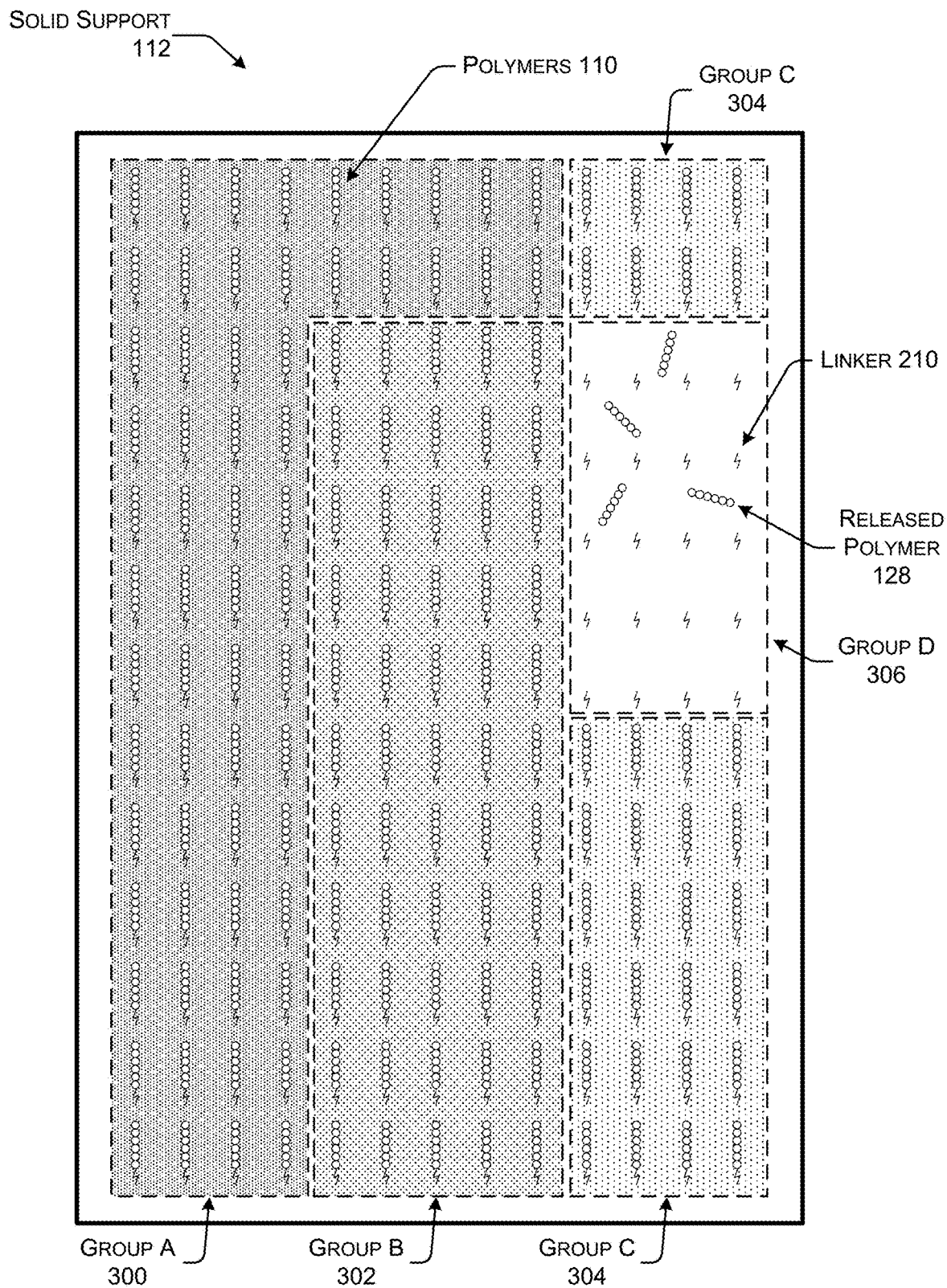
FIG. 3 shows an array of spatially addressable electrodes with polymers selectively released from one region of the array.

FIG. 3 shows an implementation of the solid support 112 partially covered with polymers 110. Each one of the polymers 110 is attached to the solid support 112 by a linker 210 as shown in FIG. 2. Upon cleavage of the linker 210, the polymers 110 are no longer covalently attached to the solid support 112 and become released polymers 128. Depending on the size of the solid support 112 and the density of the array of spatially addressable electrodes 122 (not shown in this diagram), the solid support 112 may be covered with millions or billions of individual linkers 210 and attached polymers 110.

One use for synthetic polymers such as oligonucleotides is storage of digital data. The sequence of nucleotides in DNA, for example, can encode the zeros and ones representing any type of digital data. Oligonucleotide synthesis may be used to create the strands of DNA with specific sequences that include the desired digital data. Site-specific cleavage of linkers 210 can control the release of newly synthesized DNA strands from the solid support 112 in a way that corresponds to the digital data encoded by the DNA strands. For example, all the DNA strands that contain digital data from the same computer file may be released from the solid support 112 together. The solid support 112 could then be washed removing only the DNA strands that were released and that include digital data for the computer file. These DNA strands may be stored together such as in a container such as an Eppendorf tube or dried onto a substrate such as filter paper. Thus, the DNA strands that encode digital data from the same computer file are able to be stored together without contamination from DNA strands containing digital data for other computer files. This process can be repeated to isolate and separately store multiple groups of DNA strands each group encoding digital data from a different computer file.

The attached polymers 110 may be associated with one or more different groups. The groupings may be spatial or based on a characteristic of the polymers 110 such as length, sequence, or logical association. Spatial groupings are based on the location of placement on the surface of the array of spatially addressable electrodes 122. Spatial groupings may be contiguous or discontiguous and take any possible shape. For example, spatial groupings may be in a checkerboard pattern, a square, a rectangle, a circle, etc. Logical groupings are based on a common feature possessed by the polymers that are grouped together. For example, if the attached polymers 110 are used to store digital data, the logical groupings may be based on the content of the information stored. Logical groupings may, but need not necessarily, share a spatial grouping. For example, all of the attached polymers 110 that belong to a given logical grouping may be placed together in a contiguous spatial grouping such as a rectangle-shaped grouping. However, logical groupings need not have any defined spatial grouping. Logical groupings may be distributed arbitrarily across the surface of the solid support 112.

In this illustration, the polymers 110 are shown as being divided into four different groups: group A 300, group B 302, group C 304, and group D 306. However, in an actual implementation, the number groups may be fewer or greater such as many thousands or hundreds of thousands of separate groups. Group D 306 illustrates selective cleavage of the linkers 210 to release the polymers in group D 306 without releasing the polymers 110 from any of the other groups. The linkers 210 for each group may be cleaved separately from the linkers 210 of the other groups by selective activation of different portions of the array of spatially addressable electrodes 122. Thus, the linkers 210 for any of group A 300, group B 302, group C 304, or group D 306 may be separately and independently cleaved. Group A 300, group B 302, group C 304, and group D 306 may represent either spatial or logical groupings. Spatial and logical groupings may also be combined on the same solid support 112. For example, group B 302 may represent a spatial grouping while group C 304 may represent a logical grouping.

Each grouping of attached polymers 110 may be, but is not necessarily, contiguous. For example, group C 304 is split across two separate regions. Any group may be split into any number of regions limited only by the resolution of the array of spatially addressable electrodes 122. Activation of specific sets of one or more spatially addressable electrodes 204 on the array of spatially addressable electrodes 122 can implement site-specific release of one or more groups of attached polymers 110.

Figure 4:
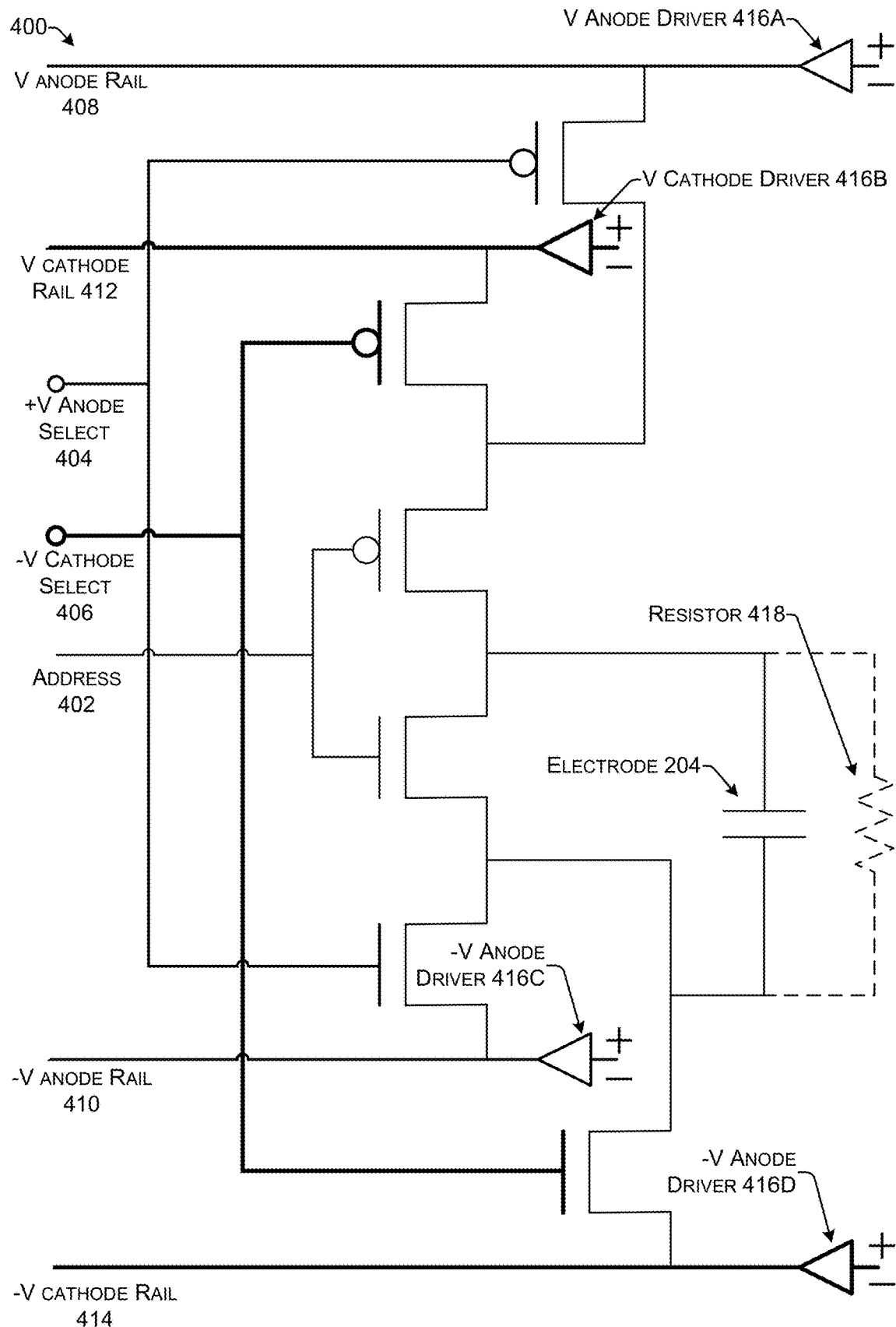
FIG. 4 illustrates a circuit with reversible voltage and current. This is an example of a circuit that can implement one of the spatially addressable electrodes.

FIG. 4 illustrates an example of a circuit 400 that may be used to implement a spatially addressable electrode 204. The circuit 400 provides the ability to both control the magnitude of the voltage flowing through the electrode 204 and to reverse the voltage thereby switching the electrode 204 between cathode and anode. The circuit 400 is an example of CMOS circuitry that may be implemented as an embedded circuit in the solid support 112 at the location of each electrode in the array of spatially addressable electrodes 122. CMOS circuitry allows for the fabrication of smaller anodes and cathodes which enables the creation of silicon chips with a higher density of independently-addressable electrodes. The electrode 204 in the circuit diagram may correspond to the physical location on the surface of the solid support 112 on which the polymers 110 are synthesized.

The circuit 400 includes an address 402 that allows for the control circuitry 126 to alter the electrical characteristics of the circuit 400. The circuit 400 also includes two selects: a +V anode select 404 and a −V cathode select 406. Electrical characteristics of the circuit 400 for performing polymer synthesis on the solid support 112 may be different than for performing linker cleavage. Oligonucleotide synthesis, for example, may occur at approximately +1.8 V. Cleavage for some types of linkers used with oligonucleotides may occur at about +2.2 V. Keeping the voltage on the surface of the solid support 112 outside of a voltage range in which the linkers may be cleaved provides an additional technique for preventing unwanted cleavage.

The +V anode select 404 is coupled to a V anode voltage supply rail 408 and a −V anode voltage supply rail 410. Activation of the V anode voltage supply rail 408 and the −V anode voltage supply rail 410 make the electrode 204 into an anode. The −V cathode select 406 is similarly connected to V cathode voltage supply rail 412 and a −V cathode voltage supply rail 414. Activation of the V cathode voltage supply rail 412 and the −V cathode voltage supply rail 414 make electrode 204 into a cathode.

Each of the voltage supply rails is connected to a driver 416 or power source that can supply both positive and negative voltage. Thus, the driver 416 may function as a positive voltage driver and/or a negative voltage driver. The V anode driver 416A and V cathode driver 416B shown at the top of the diagram are able to vary the voltage of the electrode 204 from zero to a positive value. The drivers 416C and 416D shown at the bottom of the diagram are able to vary the voltage of the electrode 204 from zero to a negative value.

In an implementation, the circuit 400 may be fabricated using a triple well process that includes a deep N-well. The deep N-well is tied to ground so it is not able to be biased. This isolates the P-type metal-oxide-semiconductor (PMOS) transistors from the N-type metal-oxide-semiconductor (NMOS) making it possible to flip the polarity of the electrode 204. With this implementation, the circuit 400 is created such that it has a triple-well substrate.

In an alternative implementation, the circuit 400 may be fabricated using a layered silicon-insulator-silicon (SOI) substrate. SOI-based devices differ from conventional silicon-built devices in that the silicon junction is above an electrical insulator, typically silicon dioxide. An SOI MOSFET is a semiconductor device in which a semiconductor layer such as silicon or germanium is formed on an insulator layer which may be a buried oxide (BOX) layer formed in a semiconductor substrate. The insulator layer creates isolation between a p-well process and an n-well process allowing separate voltages to be applied to each.

The electrode 204 in the circuit 400 may be replaced with a resistor 418 shown here using a dashed line. Other components of the circuit 400 may remain the same. Alternatively, the circuit 400 may be greatly simplified to simply provide current to the resistor 418. Resistors are passive two-terminal electrical components that implement electrical resistance as a circuit element. The power consumed by resistors is converted to heat. By replacing the electrode 204 with a resistor 418, activation of the circuit 400 does not cause a charge to flow but rather creates heat at specific locations on the surface of the solid support 112.

The solid support 112 in this implementation may then contain an array of individually addressable resistors. This allows for spatial control of linker cleavage with the use of thermolabile linkers. This is an alternative mechanism for achieving controllable, site-specific release of polymers 110 from the solid support 112. Other aspects of the application of site-specific cleavage may be the same as with the electrochemically cleavable linkers discussed elsewhere in this disclosure.

Thermolabile linkers are cleaved in the presence of heat. One structure that may be used to form thermolabile linkers is thermolytic hydroxyl protecting groups derived from 2-aminopyridine and its analogs. The resulting 2-pyridyl-substituted hydroxyl protecting groups can be efficiently cleaved with brief heat treatment at about 40-100° C. One example of thermolabile linkers is provided in U.S. Pat. No. 7,612,197. Another example of thermolabile linkers are linkers used in the CleanAmp™ phosphoramidite monomers available from Glen Research (Sterling, VA). The CleanAmp™ monomers have a (4-oxo-tetradecyl)-(N,N-diisopropyl)-phosphoramidite linker located at the three prime hydroxyl group of a deoxyribose sugar.

Heat created by the resistor 418 can cleave thermolabile linkers within sufficient proximity to the resistor 418 that the temperature at the linker rises above its cleavage temperature. For example, the temperature of the linker may be raised to approximately 37° C. for about 30 seconds. The temperature threshold and duration will vary with the specific linker chemistry. Thermal diffusion may cause thermolabile linkers that are not directly above a given spatially addressable resistor to also cleave. Thus, the resolution of the array may be determined by the thermal properties of the solid support 112 itself and of the electrolyte solution covering the surface of the solid support 112 as well as the temperature and duration of heating needed.

Figure 5:
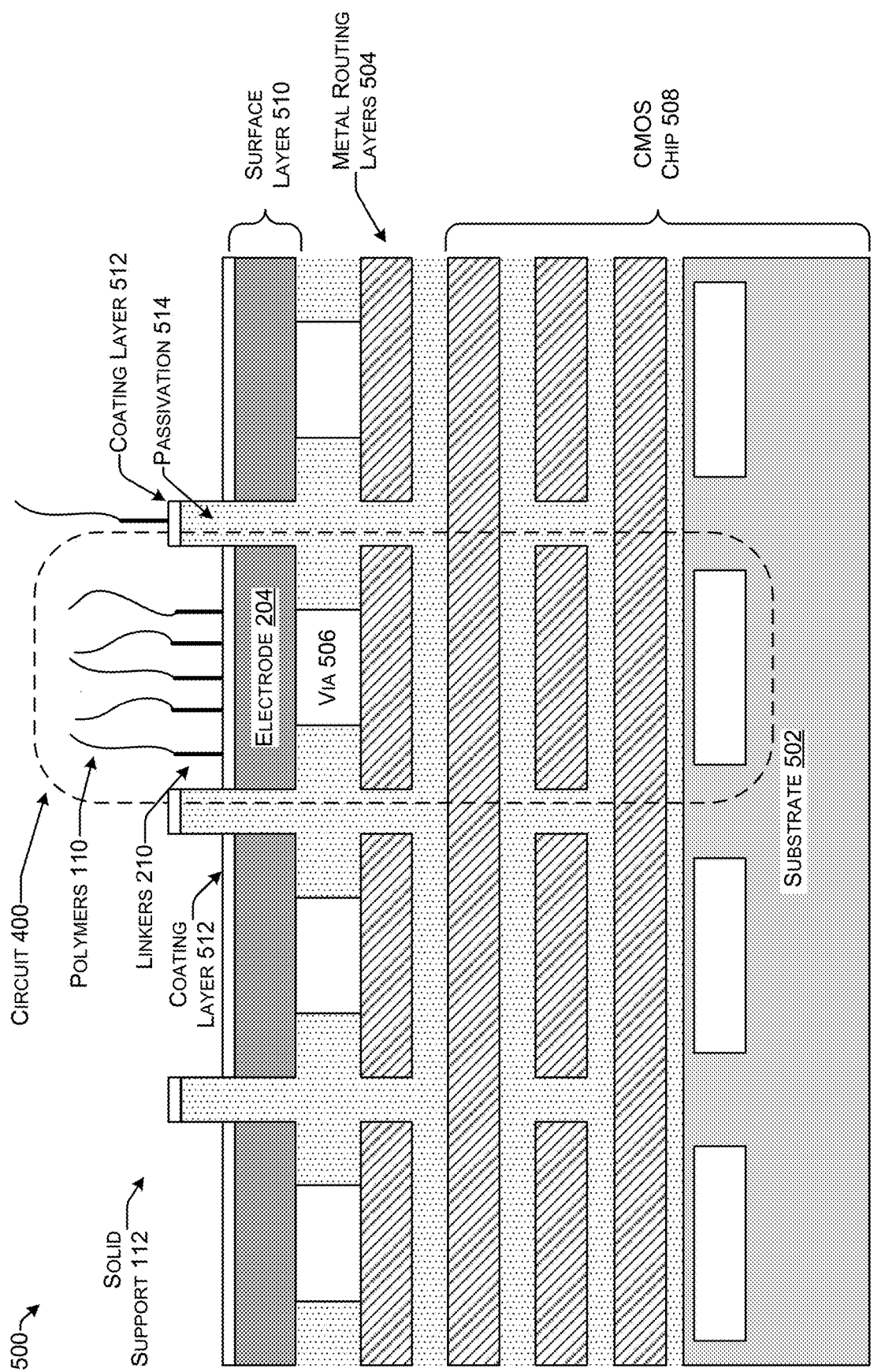
FIG. 5 is a cross-section view of a solid support with embedded, spatially addressable electrodes.

FIG. 5 is a cross-section view 500 of the solid support 112 containing the spatially addressable electrode 204. This view 500 illustrates only a portion of the array of spatially addressable electrodes 122. The circuit 400 shown in FIG. 4, or a similar circuit, is embedded at least partially within the solid support 112. The substrate 502 may be a semiconductor such as silicon and may be the same or similar to substrates used for a conventional ICs. The solid support 112 may contain multiple metal routing layers 504 that implement the connections of the circuit 400. A via 506 provides an electrical connection between the electrode 204 and one of the metal routing layers 504. The solid support 112 may contain additional vias (not shown) connecting other ones of the metal routing layers 504. The lower metal routing layers 504 and the substrate 502 may form a CMOS chip 508.

A surface layer 510 may be deposited on the top of the solid support 112. The surface layer 510 is formed from an inert conductive material. There are both metallic and non-metallic inert conductive materials. Examples of metallic, inert conductive materials include noble metals such as ruthenium (Ru), rhodium (Rh), palladium (Pd), silver (Ag), osmium (Os), iridium (Ir), platinum (Pt), or gold (Au). Examples of inert conductive materials that are non-metallic include graphene, diamond carbon, etc. The low reactivity of noble metals prevents interactions between the surface layer 510 and reagents used for the chemistry of polymer synthesis.

The surface layer 510 may be covered in whole or in part with a coating layer 512. For example, the coating layer 512 may cover all or substantially all of the surface of the solid support 112 except for portions of the electrodes 204. Leaving the surfaces of the electrodes 204 uncoated may provide for enhanced connectivity with the surrounding electrolyte solution. The coating layer 512 may be a passivation coating that forms anon-reactive seal and electrical isolation of the individual electrodes 204 as well as between the metal routing layers 504. The seal provided by the passivation coating prevents electrolytic solution and other reagents from entering inside and damaging the solid support 112 or the circuit 400. The passivation coating may be a silicon-based coating such as silicon nitride $Si_3N_4$ or silicon dioxide $SiO_2$. The solid support 112 may also include passivation 514 that occupies space between the surface layer 510, the metal routing layers 504, and the substrate 502. The passivation coating may be a continuation of the passivation 514 as of the same material which provides that external coating layer 512 is also the passivation 514 within the structure of the solid support 112.

The coating layer 512 may be a functionalization coating that promotes attachment of linkers 210. One type of functionalization is silanization which covers a surface with organofunctional alkoxysilane molecules. This treatment creates a uniform layer of primary amines or epoxides that are available to react with linkers 210. Mineral components like glass and metal oxide surfaces can all be silanized because they contain hydroxyl groups which attack and displace the alkoxy groups on the silane thus forming a covalent —Si—O—Si— bond. Functionalization may also be performed by addition of silica nanoparticles or porous silica to a surface. Other modifications of the surface of the surface layer 510 that provide a location for covalent coupling include the addition of carboxylic acid groups, primary aliphatic amines, aromatic amines, chloromethyl (vinyl benzyl chloride), secondary amine groups, hydrazide groups, aldehydes, hydroxyl groups, thiol groups, epoxy groups, mercaptosilanes, etc. Functionalization may also be provided by coating the surface layer 510 with agarose. Some passivation coatings may also functionalize the surface. Thus, the same material may be both the passivation coating and a functionalization coating.

Figure 6:
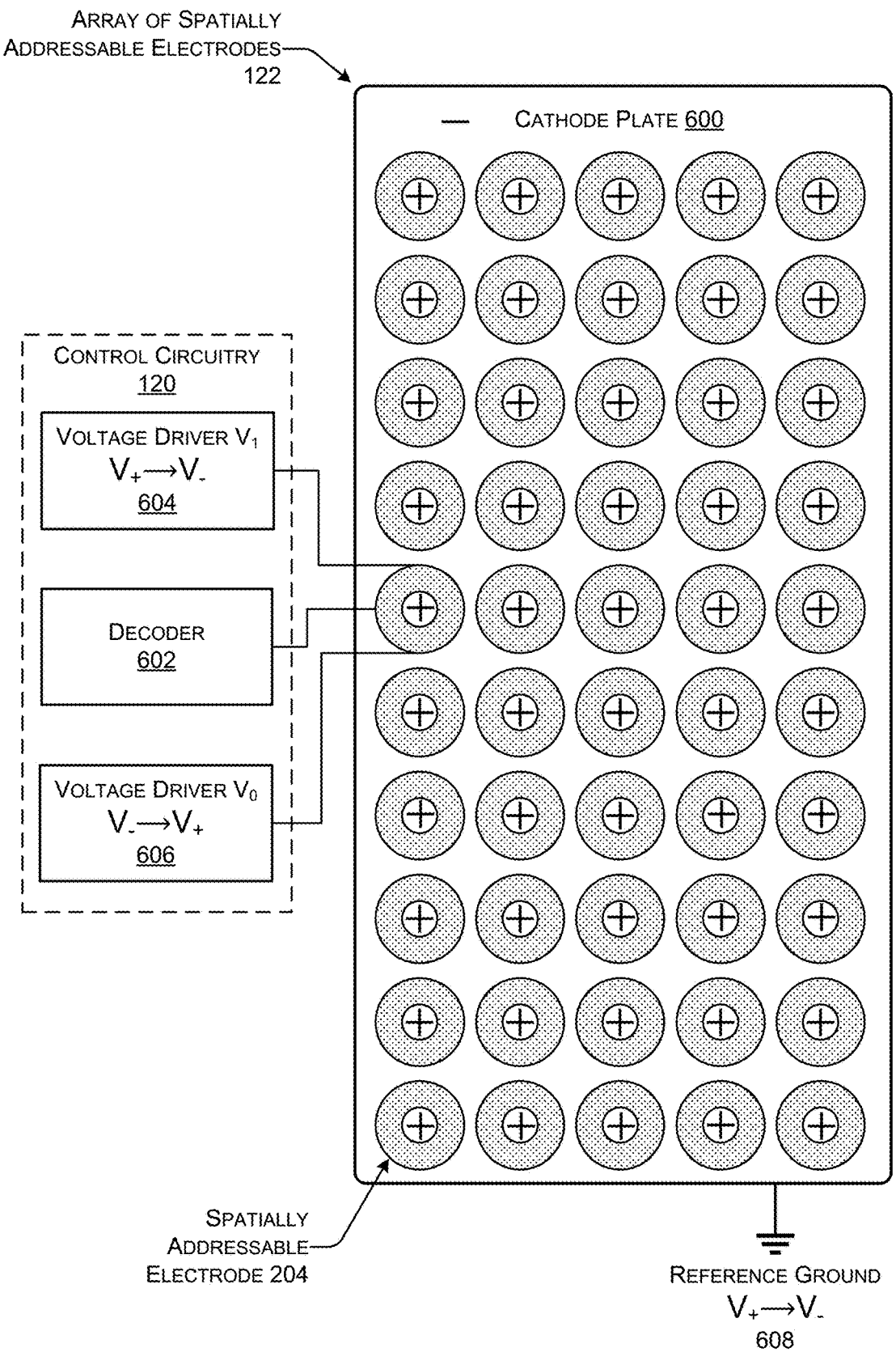
FIG. 6 shows an array of spatially addressable electrodes with an on-array counter electrode implemented as a cathode plate.

FIG. 6 shows an implementation of the array of spatially addressable electrodes 122 in which the counter electrode is implemented as a common cathode plate 600. The common cathode plate 600 acts as a common cathode for all of the spatially addressable electrodes 204 that act as anodes. However, as described earlier, the polarity of the cathodes and anodes may be reversed so that the common cathode plate 600 becomes an anode plate and one or more the spatially addressable electrodes 204 become a negative cathode. In this implementation, all of the individual circuits in the spatially addressable electrodes 204 may be tied to the same voltage. The circuits in the array of spatially addressable electrodes 122 may all share a common reference ground 608 that provides a single electrical return path for all signals.

Although shown here as being arranged in a regular grid and described elsewhere as an "array" there is no fixed or required geometry for the arrangement of the individual electrodes within the array of spatially addressable electrodes 122. The number of electrodes in each row and column of the array of spatially addressable electrodes 122 shown in FIG. 6 is merely illustrative. In an implementation, the electrodes may be arranged at nanometer scale density leading to a high number of electrodes being present on an actual solid support 112 with the dimensions of a typical IC chip.

Each of the individual spatially addressable electrodes 204 may contain the circuit 400 shown in FIG. 4 or a similar circuit. The circuits are controlled by the control circuitry 126 which may include a decoder 602, a first voltage driver $V_1$ 604, and a second voltage driver $V_2$ 606. In an implementation, the decoder 602 may be a combinatorial logic decoder that controls the pattern of activation of the electrodes in the array of spatially addressable electrodes 122 in response to binary signals provided by the synthesizer control module 104. Specifically, the decoder 602 may control the polarity and amount of charge provided to each electrode by either the first voltage driver $V_1$ 604 or by the second voltage driver $V_2$ 606.

The decoder 602 functions as an interface between the control circuitry 126 and the electrodes themselves. Thus, the decoder 602 may implement the instructions 108 provided by the synthesizer control module 104. In an implementation, components of the control circuitry 126 such as the decoder 602 and the voltage drivers 604, 606 are on-array components that are included within the solid support 112 such as within the substrate 502.

The decoder 602 may represent multiple decoders such as a first decoder that activates specific electrodes and a second decoder that controls the voltage of the active electrodes. The first decoder may activate specific electrodes to function as a cathode or an anode by addressing individual bits through the address 402 shown in FIG. 4. The second decoder may control the voltage of the electrode through selects such as the +V anode select 404 or the −V cathode select 406 shown in FIG. 4.

Figure 7:
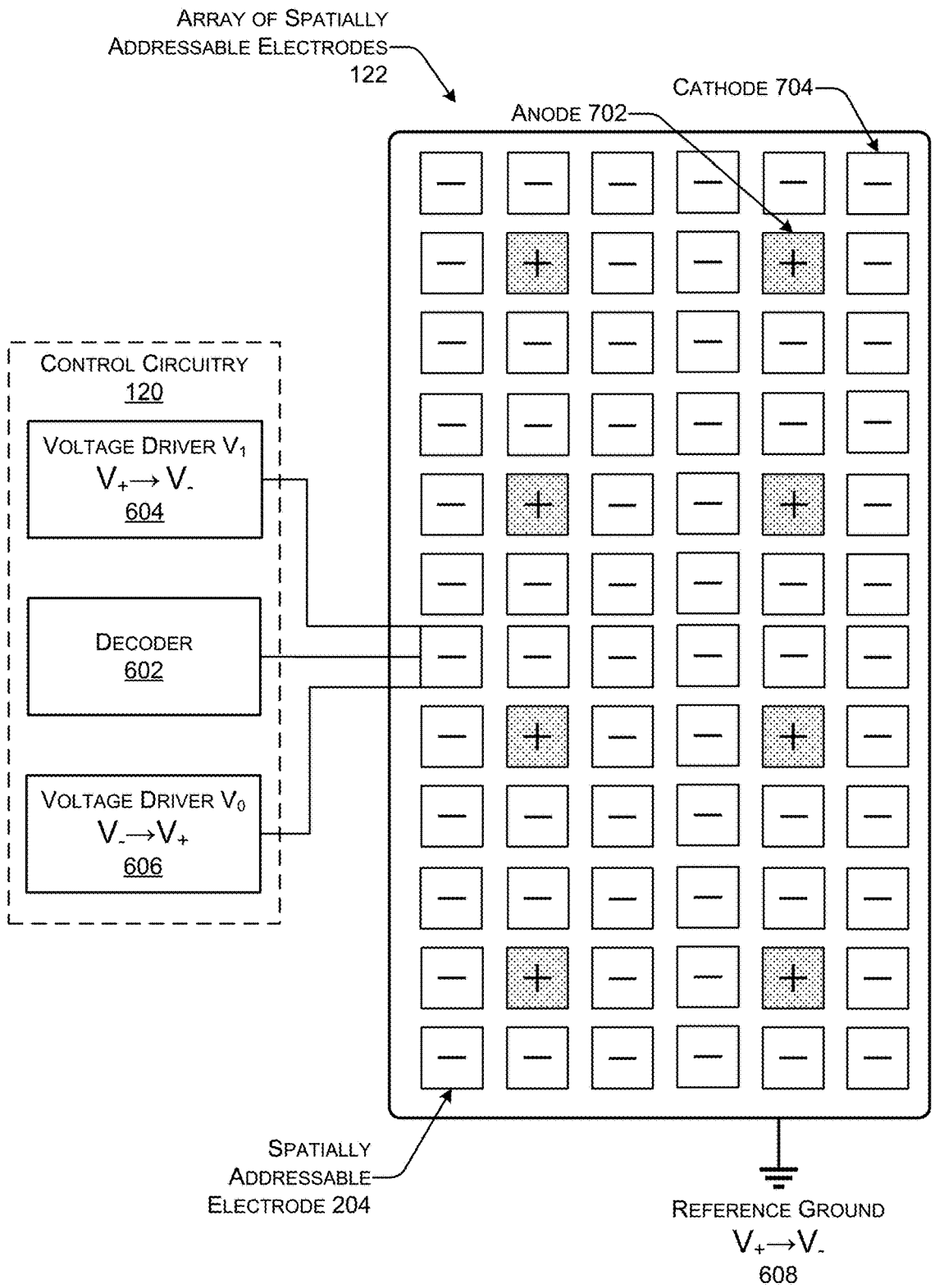
FIG. 7 illustrates an example of an electrode array in which individual electrodes take opposite charges to function as a counter electrode.

FIG. 7 shows a view 700 of an array of spatially addressable electrodes 122 in which the charges of groups of the spatially addressable electrodes 204 are reversed to act as counter electrodes. Unlike the implementation shown in FIG. 6, this implementation does not include a main plate electrode. Rather, regions of the array of spatially addressable electrodes 122 can be configured to act as either anodes or cathodes. This is possible because each of the spatially addressable electrodes 204 is capable of having a separate voltage from the others.

Several different electrodes may act as a positive anode 702 each surrounded by three, four, five, six, seven, eight, nine or more electrodes each configured as a negative cathode 704. This creates multiple current differentials on the surface of the array or spatially addressable electrodes 122 in which the anodes and cathodes may function in any of the ways described elsewhere in this disclosure.

The control circuitry 126, decoder 602, voltage driver $V_1$ 604, voltage driver $V_2$ 606, and the reference ground 608 may be the same as shown in FIG. 6.

Figure 8:
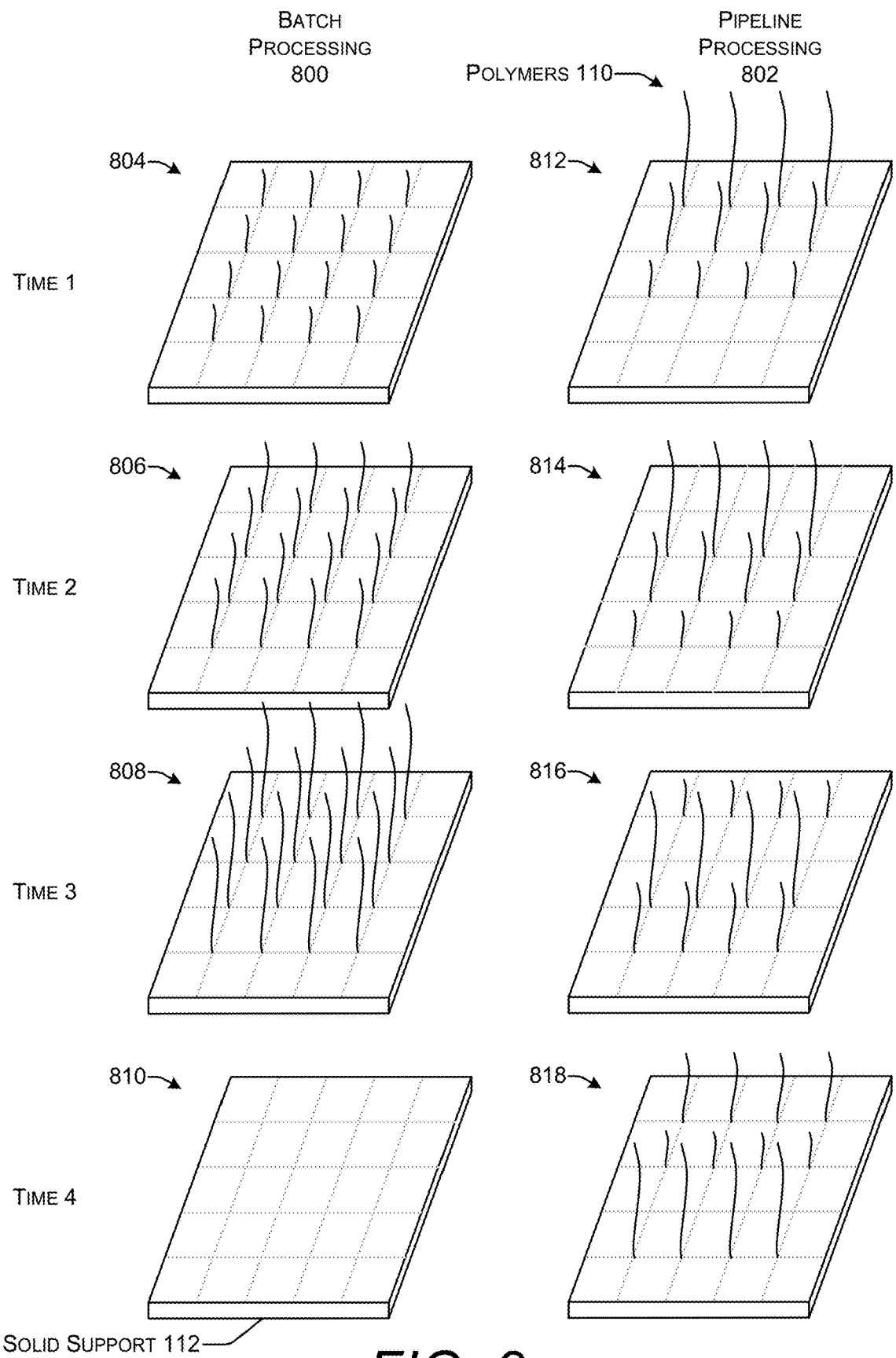
FIG. 8 shows polymers growing on and being cleaved from a solid support in a batch processing implementation and in a pipeline processing implementation.

FIG. 8 shows polymers 110 growing on and being cleaved from a solid support 112 in a batch processing 800 implementation and in a pipeline processing 802 implementation. Four different time points are shown to illustrate the dynamic growth of the polymers 110. Polymers 110 with different sequences may be grown at different locations on the solid support 112 by using a technique which selectively de-protects individual polymer strands or clusters of polymer strands. Only the de-protected polymer strands are able to incorporate the monomer subunit 114 provided by the synthesizer 106. Thus, selective de-protection controls which polymers 110 may incorporate an additional monomer. Examples of techniques that use selective de-protection to create polymers 110 with specific sequences include conventional solid-phase oligonucleotide synthesis and SPPS described above.

Batch processing 800 at time 1 as shown in view 804 has multiple short polymer strands attached to the whole surface of the solid support 112. In this example, the polymers 110 are all growing at the same rate but may grow at different rates depending on the respective sequences of the polymers 110 and the specific synthetic technique.

As polymer strands grow, they become longer at time 2 shown in view 806. Time 3 illustrates in view 808 the polymers 110 at their full length. This is the end of polymer synthesis for this batch. All the polymers are then cleaved from the solid support at the same time using techniques described in this disclosure or other techniques known in the art. View 810 shows the solid support 112 at time 4 after cleavage of the polymers 110. After time 4, the solid support 112 may again be used to synthesize a new batch of polymers 110 returning to a configuration such as shown at time 1 but with different polymers 110.

Pipeline processing 802 uses the solid support 112 differently by growing polymers 110 at different stages of synthesis simultaneously. Pipeline processing 802, like batch processing 800, uses selective de-protection to add specific monomers to individual ones of the growing polymers 110. Pipeline processing 802 also uses selective cleavage by reversing the polarity of spatially addressable electrodes to cleave some but not all of the polymers 110 from the surface of the solid support 112.

View 812 shows three sets of polymers 110 at different stages of synthesis. The longest polymers 110 are illustrated at the rear, polymers 110 in the middle have a medium length, and the shortest polymers 110 that have started synthesis to most recently are shown towards the front of the solid support 112. The polymers 110 in each row may share a logical relationship such as all encoding related pieces of information which the polymers 110 in the other rows may encode different information or may be intended for an entirely different purpose.

View 814 shows further progress of synthesis using pipeline processing 802. As synthesis has proceeded, the full-length polymers 110 from the rear of the solid support 112 in view 812 were cleaved, the polymers 110 growing in the middle section of the solid support 112 are becoming longer, and new polymers 110 are starting to grow on the front of the solid support 112. Thus, in this example, there are polymers 110 at three different stages of growth on the same solid support 112. Of course, in an actual implementation, there may be many more than three different stages of polymer synthesis present on the same solid support 112.

View 816 shows further growth and selective cleavage of the polymers 110 on the solid support 112. Here, the newest polymers 110 are growing on the rear of the substrate.

The process of growth, cleavage, and synthesis of new polymers 110 continues during pipeline processing 802 as shown in view 818. After time 4, the pipeline process 802 may proceed to a state in which the length and arrangement of polymers 110 are the same as view 812, but the sequences of the actual polymers 110 attached to the solid support 112 will be different than the polymers 110 shown in view 812.

Thus, site-specific cleavage made possible by an array of spatially addressable electrodes 122 allows continuous use of the solid support 112 by releasing polymers 110 when synthesis is complete and initiating synthesis of new polymers 110 at the same location.

Although the arrangement of the growing polymers 110 is shown in this example of pipeline processing 802 as arranged in rows, any separately addressable position on the surface of the solid support 112 may be used independently from all other positions. Thus, the solid support 112 may have a variety of different lengths of polymers 110 attached to its surface with no particular structure or pattern as to the relative lengths of the growing polymers 110.

Pipeline processing 802 provides greater flexibility as compared to batch processing 800. One potential advantage of pipeline processing 802 is that the synthesizer is not idled as shown at time 4 in view 810. Pipeline processing 802 provides the ability to start growing new polymers 110 without waiting for the synthesis of every polymer strand on the solid support 112 to finish. Pipeline processing 802 also provides flexibility to use less than the full capacity of the solid support 112 (which may be the capacity of the synthesizer 106) without tying up the remaining capacity.

Consider a request to synthesize fewer polymers 110 than the capacity of the synthesizer 106 can accommodate. With batch processing 800 synthesis is either delayed until there is a large enough total volume of requests to use the full capacity of the synthesizer 106 synthesis capacity is unused. Thus, there is either a delay or the synthesizer 106 is run at less than full capacity. However, with pipeline processing 802, synthesis can start immediately and any later-received requests for synthesis of polymers 110 may be added to the synthesizer while the synthesis of the first set of polymers 110 continues.

Some polymers 110 will complete synthesis before other polymers 110. With pipeline processing 802, polymers 110 that have reached their full length may be cleaved from the solid support 112 and synthesis of a new polymer strand may be started at the same location. Thus, multiple polymers 110 may be synthesized one-after-the-other at the same position on the solid support 112.

Polymers 110 that are synthesized at the same position on the solid support 112 may be thought of as concatenated (although not physically connected) into long "super-strands." A super-strand may be "cut" to obtain the individual physical polymers 110. For example, if three DNA strands T-G-A, C-A-G, and C-T-G are all synthesized on the same position on the solid support 112, an oligonucleotide synthesizer will produce three DNA strands each with three nucleotides. A super-strand representing the activity of this position on the solid support 112 will, however, be the concatenated sequence of T-G-A-C-A-G-C-T-G even though no such 9-mer nucleotide is synthesized. Intentional ordering of the polymer sequences that form a super-strand may be selected to increase overall synthesis efficiency. One technique for using super-strands to increase synthesis efficiency is described in US Patent Application entitled "Efficient Polymer Synthesis" filed concurrently with this application.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and unless other otherwise contradicted by context any number of the described process blocks may be combined in any order to implement the process or an alternate process. Moreover, it is also possible that one or more of the provided operations is modified or omitted.

Figure 9:
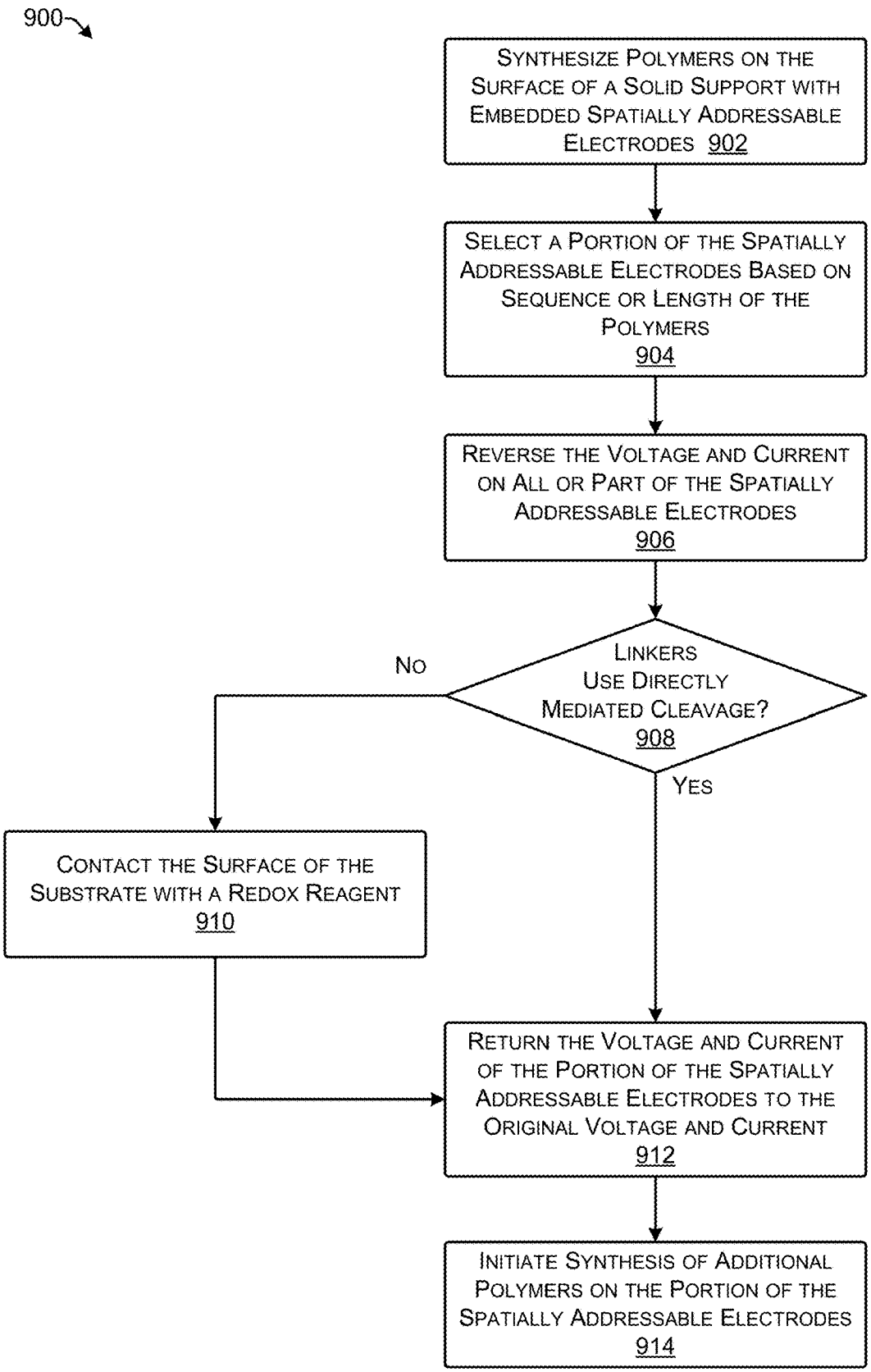
FIG. 9 is a flow diagram showing an illustrative process for selectively freeing polymers from a solid support.

FIG. 9 shows process 900 for selectively releasing polymers from a solid support by reversing the voltage and current of spatially addressable electrodes embedded in the solid support. Process 900 may be implemented, for example, using any of the systems or devices shown in FIGS. 1-7.

At 902, polymers are synthesized on the surface of the solid support with the embedded spatially addressable electrodes. Electrochemically cleavable linkers may be attached to the surface of the solid support. Thus, the electrochemically cleavable linkers may be attached to the spatially addressable electrodes. The polymers may be synthesized on the electrochemically cleavable linkers. The polymers may be the same or similar to the polymers 110 introduced in FIG. 1. For example, the polymers may be oligonucleotides grown by conventional solid-phase oligonucleotide synthesis techniques, by enzymatic nucleotide synthesis, or polypeptides grown by conventional SPPS techniques. Techniques for solid phase synthesis of these or other types of polymers are known to those of ordinary skill in the art.

At 904, a portion of the spatially addressable electrodes are selected. The particular electrodes may be selected based on a characteristic of the attached polymers such as the sequence or length. For example, all polymers that have one of a specified sequence (known as a result of using a synthesis technique that controls where specific polymers are generated on the solid support) may be selected for separation from the solid support. Also, all polymers of a given length (e.g., full-length) may be selected. The identity of polymers that are full-length, or any other arbitrary length, may inferred based on the sequences for those polymers, the order in which the synthesizer has added monomer subunits, and the number of rounds of monomer addition. Additional techniques for identifying polymers to separate from a solid support, and thus, selecting electrodes are described US Patent Application entitled "Efficient Polymer Synthesis" filed concurrently with this application.

At 906, the voltage and current are reversed for all or part of the spatially addressable electrodes selected at 904. If the voltage and current are reversed for all of the spatially addressable electrodes, then the entire batch of synthesized polymers is separated from the solid support such as shown, for example, in the batch process 800 implementation of FIG. 8. The voltage and current may be reversed for only a single electrode or any portion of the total number of spatially addressable electrodes. For example, the release of the polymers in group D 306 shown in FIG. 3 illustrate reversing the voltage and current for only a portion of the array of spatially addressable electrodes.

At 908, process 900 diverges depending on how the linkers are cleaved. If the linkers are electrochemically cleavable linkers that exhibit directly mediated cleavage by cleaving in response to changing ionic conditions caused by reversing the electrode, then the linkers are cleaved and process 900 proceeds along the "yes" path to 912. For example, the linkers may cleaved by a redox reaction upon addition of electrons when the voltage and current of a one of the spatially addressable electrodes (204) is reversed. However, if the linkers are not directly cleaved by a change in the ionic conditions alone but require the presence of specific redox reagent to cleave, then process 900 proceeds along "no" path to 910.

At 910, the surface of the solid support is contacted with a redox reagent that cleaves the linkers. For example, the redox reagent may be hydroquinone or carbon dioxide that creates an acid which cleaves acid labile linkers. In an implementation, the entire surface of the solid support is exposed to the redox reagent such as by flowing the redox reagent across the surface of the solid support or by introducing the redox reagent into an electrochemical cell containing the solid support. Cleavage of the linkers occurs only at locations where the voltage and current of the spatially addressable linkers are reversed.

At 912, the polarity of the spatially addressable electrodes where the voltage and current were previously reversed are returned to the original voltage and current. The original voltage and current is the voltage and current of those electrodes prior to the reversal at 906. This original voltage and current may be a voltage and current that is suitable for polymer synthesis. Thus, synthesis of new polymers may be initiated at this portion of the solid substrate once the voltage and current are returned to the original levels.

At 914, synthesis of additional polymers is initiated on the locations on the solid support corresponding to the spatially addressable electrodes where voltage and current were reversed at 906. Thus, after a first set of polymers have been released from one or more of the spatially addressable electrodes, a new set of polymers is synthesized at the same location. This may occur even if polymers remain attached to other portions of the solid support. An example of this is illustrated by the pipeline processing 802 implementation shown in FIG. 8.

Furthermore, depending on specific linker chemistry, linkers that have been cleaved to release bound polymers may be reused to start synthesis of a new polymer. For example, the linkers 210 for group D 306 in FIG. 3 may be reused after selective release of the attached polymer. This may occur while polymer synthesis is ongoing for one or more of the other groups such as Group A 300, Group B 302, or Group C 304 on the solid support shown in FIG. 3.

Illustrative Computer Architecture

Figure 10:
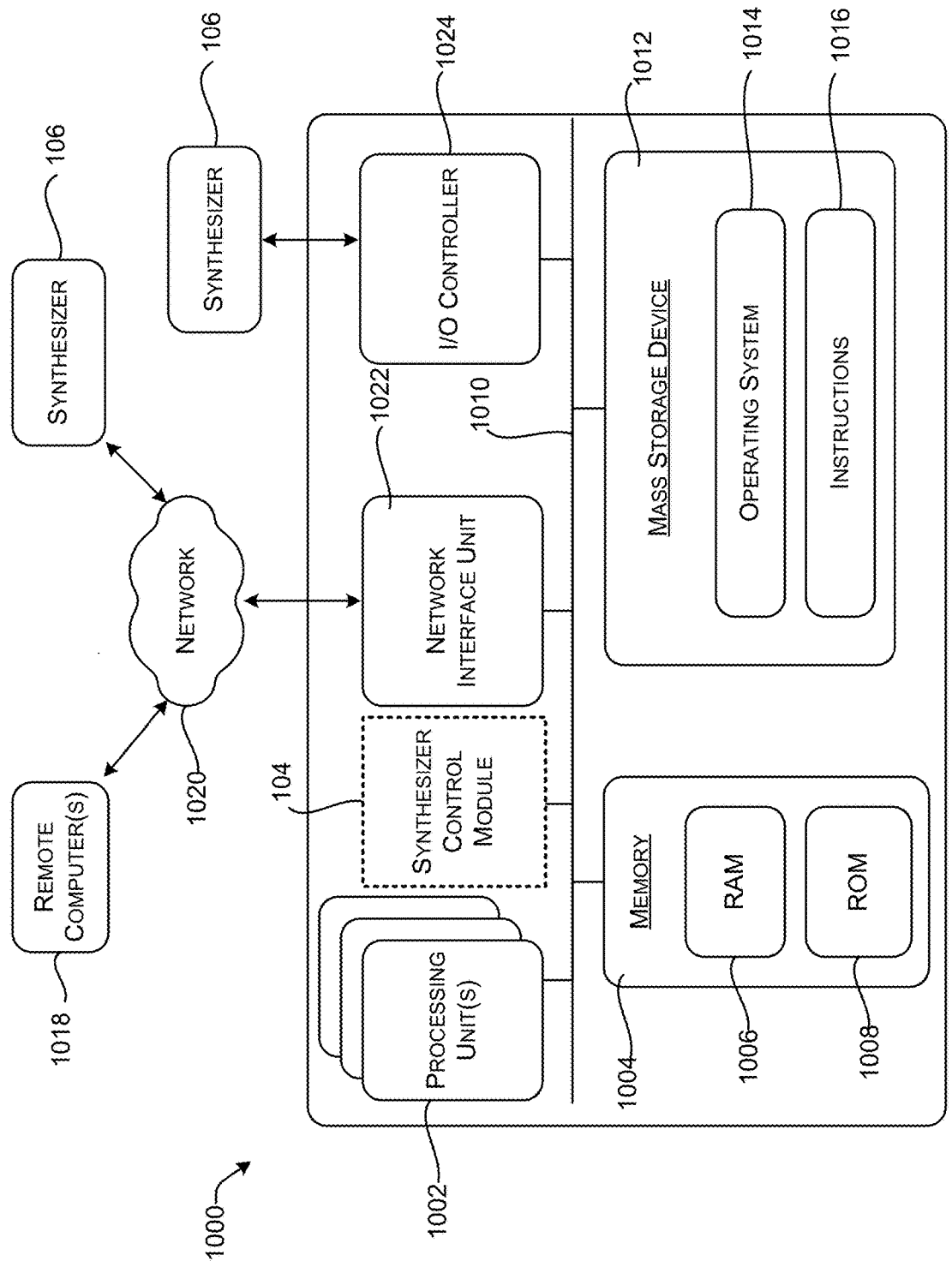
FIG. 10 is an illustrative computer architecture for implementing techniques of this disclosure.

FIG. 10 is a computer architecture diagram showing an illustrative computer hardware and software architecture for a computing device such as the computing device 102 introduced FIG. 1. In particular, the computer 1000 illustrated in FIG. 10 can be utilized to implement the synthesizer control module 104.

The computer 1000 includes one or more processing units 1002, a system memory 1004, including a random-access memory 1006 ("RAM") and a read-only memory ("ROM") 1008, and a system bus 1010 that couples the memory 1004 to the processing unit(s) 1002. A basic input/output system ("BIOS" or "firmware") containing the basic routines that help to transfer information between elements within the computer 1000, such as during startup, can be stored in the ROM 1008. The computer 1000 further includes a mass storage device 1012 for storing an operating system 1014 and other instructions 1016 that represent application programs and/or other types of programs such as, for example, instructions to implement the synthesizer control module 104. The mass storage device 1012 can also be configured to store files, documents, and data.

The mass storage device 1012 is connected to the processing unit(s) 1002 through a mass storage controller (not shown) connected to the bus 1010. The mass storage device 1012 and its associated computer-readable media provide non-volatile storage for the computer 1000. Although the description of computer-readable media contained herein refers to a mass storage device, such as a hard disk, CD-ROM drive, DVD-ROM drive, or USB storage key, it should be appreciated by those skilled in the art that computer-readable media can be any available computer-readable storage media or communication media that can be accessed by the computer 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

By way of example, and not limitation, computer-readable storage media can include volatile and non-volatile, removable and non-removable media implemented in any method or technology for storage of information such as computer-readable instructions, data structures, program modules or other data. For example, computer-readable storage media includes, but is not limited to, RAM 1006, ROM 1008, EPROM, EEPROM, flash memory or other solid-state memory technology, CD-ROM, digital versatile disks ("DVD"), HD-DVD, BLU-RAY, 4K Ultra BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer-readable storage medium," and variations thereof, does not include waves or signals per se or communication media.

According to various configurations, the computer 1000 can operate in a networked environment using logical connections to a remote computer(s) 1018 through a network 1020. The computer 1000 can connect to the network 1020 through a network interface unit 1022 connected to the bus 1010. It should be appreciated that the network interface unit 1022 can also be utilized to connect to other types of networks and remote computer systems. The computer 1000 can also include an input/output controller 1024 for receiving and processing input from a number of other devices, including a keyboard, mouse, touch input, an electronic stylus (not shown), or equipment such as a synthesizer 106 for synthesizing polymers such as polynucleotides. Similarly, the input/output controller 1024 can provide output to a display screen or other type of output device (not shown).

It should be appreciated that the software components described herein, when loaded into the processing unit(s) 1002 and executed, can transform the processing unit(s) 1002 and the overall computer 1000 from a general-purpose computing device into a special-purpose computing device customized to facilitate the functionality presented herein. The processing unit(s) 1002 can be constructed from any number of transistors or other discrete circuit elements, which can individually or collectively assume any number of states. More specifically, the processing unit(s) 1002 can operate as a finite-state machine, in response to executable instructions contained within the software modules disclosed herein. These computer-executable instructions can transform the processing unit(s) 1002 by specifying how the processing unit(s) 1002 transitions between states, thereby transforming the transistors or other discrete hardware elements constituting the processing unit(s) 1002.

Encoding the software modules presented herein can also transform the physical structure of the computer-readable media presented herein. The specific transformation of physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 to store and execute the software components presented herein. It also should be appreciated that the architecture shown in FIG. 10 for the computer 1000, or a similar architecture, can be utilized to implement many types of computing devices such as desktop computers, notebook computers, servers, supercomputers, gaming devices, tablet computers, and other types of computing devices known to those skilled in the art. For example, the computer 1000 may be wholly or partially integrated into the synthesizer 106. It is also contemplated that the computer 1000 might not include all of the components shown in FIG. 10, can include other components that are not explicitly shown in FIG. 10, or can utilize an architecture completely different than that shown in FIG. 10.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method for selectively releasing polymers (110) from a solid support (112) comprising an array of spatially addressable electrodes (122), the method comprising: synthesizing the polymers (110) on the solid support (112); and reversing voltage and current on all or part of the array of spatially addressable electrodes (122), wherein the polymers (110) separate from the solid support (112) only at locations on the solid support (112) corresponding to spatially addressable electrodes (122) where voltage and current are reversed (210; 306).

Clause 2. The method of clause 1, wherein the polymers comprise oligonucleotides and the synthesizing uses the phosphoramidite method or enzymatic nucleotide synthesis.

Clause 3. The method of clause 1 or 2, further comprising selecting the part of the spatially addressable electrodes based on sequences of the polymers or lengths of the polymers.

Clause 4. The method of any of clauses 1-3, further comprising: returning the voltage and current of the part of the array of spatially addressable electrodes to an original voltage and current; and initiating synthesis of additional polymers on the locations on the solid support corresponding to the spatially addressable electrodes where the voltage and current were previously reversed.

Clause 5. The method of any of clauses 1-4, wherein the polymers are attached to the solid support (112) by linkers (210) that cleave in the presence of a redox reagent (118) when the voltage and current of a one of the spatially addressable electrodes (204) are reversed; and further comprising contacting the solid support (112) with the redox reagent (118).

Clause 6. The method of clause 5, wherein the redox reagent comprises hydroquinone or carbon dioxide.

Clause 7. The method of any of clauses 1-6, wherein the polymers are attached to the solid support by electrochemically cleavable linkers (210) cleaved by a redox reaction upon addition of electrons in response to the reversing the voltage and current.

Clause 8. A solid support for solid-phase synthesis of polymers comprising: a substrate (502); a surface layer (510) comprising an inert conductive material; an embedded circuit (400) comprising a spatially addressable electrode (204) connected to a positive voltage driver (416) and a negative voltage driver (416); and control circuitry (126) configured to switch the spatially addressable electrode (204) from anode to cathode by controlling the positive voltage driver (416) and the negative voltage driver (416).

Clause 9. The solid support of clause 8, wherein the inert conductive material comprises a noble metal, graphene, or diamond carbon.

Clause 10. The solid support of clause 8 or 9, further comprising a coating layer at least partially covering the surface layer, wherein the coating layer is a passivation coating, a functionalization coating, or both.

Clause 11. The solid support of any of clauses 8-10, wherein the embedded circuit (400) comprises a complementary metal-oxide-semiconductor (CMOS) inverter.

Clause 12. The solid support of any of clauses 8-11, wherein the substrate is a triple-well substrate.

Clause 13. The solid support of any of clauses 8-11, wherein the substrate is a silicon on insulator (SOI) substrate.

Clause 14. The solid support of any of clauses 8-13, wherein the control circuitry (126) comprises an on-array combinatorial logic decoder (602).

Clause 15. The solid support of any of clauses 8-14, further comprising a common cathode plate (600).

Clause 16. A system comprising: a solid support (112) comprising an array of spatially addressable electrodes (122); control circuitry (126) configured to selectively activate a spatially addressable electrode (204) in the array of spatially addressable electrodes (122) by supplying positive or negative voltages; and one or more fluid delivery pathways (124A) configured to deliver monomer subunits (114) to an electrolytic cell (116) containing the solid support (112).

Clause 17. The system of clause 16, further comprising a computing device (102) configured to provide instructions and (108) to the control circuitry (126), the instructions (108) indicating a plurality of electrodes of the array of spatially addressable electrodes (122) on which to reverse polarity.

Clause 18. The system of clause 16 or 17, wherein the spatially addressable electrode is connected to a +V anode select (404) and a −V cathode select (406), wherein the +V anode select (404) is connected to a V anode driver (416A) and a −V anode driver (416C) and wherein the −V cathode select (406) is connected to a V cathode driver (416B) and a −V cathode driver (416D).

Clause 19. The system of any of clauses 16-18, further comprising an electrochemically cleavable linker (210) cleaved by a redox reaction upon addition of electrons, the electrochemically cleavable linker (210) attached to a surface the spatially addressable electrode (204).

Clause 20. The system of any of clauses 16-19, wherein the system comprises an oligonucleotide synthesizer.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced. As used herein, "approximately" or "about" or similar referents denote a range of ±10% of the stated value.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents and/or patent applications throughout this specification. Each of the cited references is individually incorporated herein by reference for its particular cited teachings as well as for all that it discloses.

The invention claimed is:

1. A method for selectively releasing polymers from a solid support comprising an array of spatially addressable electrodes, the method comprising:
   synthesizing the polymers directly on the solid support or directly on linkers attached to the solid support;
   reversing voltage and current on part of the array of spatially addressable electrodes, wherein the polymers separate from the solid support only at locations on the solid support corresponding to spatially addressable electrodes where voltage and current are reversed;
   returning the voltage and current of the part of the array of spatially addressable electrodes to an original voltage and current; and
   initiating synthesis of additional polymers on the locations on the solid support corresponding to the spatially addressable electrodes where the voltage and current were previously reversed.

2. The method of claim 1, wherein the polymers comprise oligonucleotides and the synthesizing uses a phosphoramidite method or enzymatic nucleotide synthesis.

3. The method of claim 1, further comprising selecting the part of the spatially addressable electrodes based on sequences of the polymers or lengths of the polymers.

4. The method of claim 1, wherein the polymers are attached to the solid support by linkers that cleave in the presence of a redox reagent when the voltage and current of a one of the spatially addressable electrodes are reversed; and
   further comprising contacting the solid support with the redox reagent.

5. The method of claim 4, wherein the redox reagent comprises hydroquinone or carbon dioxide.

6. The method of claim 1, wherein the polymers are attached to the solid support by electrochemically cleavable linkers cleaved by a redox reaction upon addition of electrons in response to the reversing the voltage and current.

7. The method of claim 1, wherein the polymers are attached to the solid support by electrochemically cleavable linkers that include at least one electrochemically cleavable bond which cleaves by oxidation or reduction in response to activation of a spatially addressable electrode.

8. The method of claim 1, further comprising reversing voltage and current on only a first part of the array of spatially addressable electrodes without reversing voltage and current on a second part of the array of spatially addressable electrodes.

9. A method for selectively releasing polymers from a solid support comprising an array of spatially addressable electrodes, the method comprising:
   synthesizing the polymers on the solid support, wherein the polymers are attached directly to the solid support by electrochemically cleavable linkers that include at least one electrochemically cleavable bond which cleaves by oxidation or reduction in response to activation an electrode; and
   reversing voltage and current on only a first part of the array of spatially addressable electrodes without reversing voltage and current on a second part of the array of spatially addressable electrodes, wherein the electrochemically cleavable linkers are cleaved and the polymers separate from the solid support only at the first part of the array of spatially addressable electrodes.

10. The method of claim 9, wherein the at least one electrochemically cleavable bond comprises an ester or amide linkage and a protected alcohol or amine.

11. The method of claim 9, wherein the polymers comprise oligonucleotides and the synthesizing uses a phosphoramidite method or enzymatic nucleotide synthesis.

12. The method of claim 9, further comprising:
returning the voltage and current of the first part of the array of spatially addressable electrodes to an original voltage and current; and
initiating synthesis of additional polymers on a portion of the solid support corresponding to the first part of the array of spatially addressable electrodes where the voltage and current were previously reversed by reuse of linkers attached to the portion of the solid support.

13. The method of claim 9, further comprising:
selecting the first part of the array of spatially addressable electrodes based on sequences of the polymers or lengths of the polymers attached to the solid support at the first part of the array of spatially addressable electrodes.

14. A method for pipeline synthesis of polymers on a solid support comprising an array of spatially addressable electrodes, the method comprising:
synthesizing a first set of polymers directly, or directly via linkers, on a first portion of the solid support and directly, or directly via linkers, on a second portion of the solid support;
reversing voltage and current on a first part of the array of spatially addressable electrodes corresponding to the first portion of the solid support, thereby releasing a portion of the first set of polymers from the first portion of the solid support and not from the second portion of the solid support;
returning the voltage and current of the first part of the array of spatially addressable electrodes to an original voltage and current; and
initiating synthesis of a second set of polymers at the first portion of the solid support by reuse of the linkers attached to the first portion of the solid support while the first set of polymers remains attached to the second portion of the solid support.

15. The method of claim 14, wherein initiating synthesis of the second set of polymers occurs while synthesis of the first set of polymers is ongoing.

16. The method of claim 14, wherein the polymers comprise oligonucleotides and the synthesizing uses a phosphoramidite method or enzymatic nucleotide synthesis.

17. The method of claim 14, wherein the polymers are attached to the solid support by electrochemically cleavable linkers that include at least one electrochemically cleavable bond which cleaves by oxidation or reduction in response to activation of a spatially addressable electrode.

18. The method of claim 14, wherein the polymers are attached to the solid support by electrochemically cleavable linkers cleaved by a redox reaction upon addition of electrons in response to the reversing the voltage and current.

19. The method of claim 14, further comprising:
selecting the first part of the array of spatially addressable electrodes based on sequences of the first set of polymers or lengths of the first set of polymers attached to the solid support at the first part of the array of spatially addressable electrodes.

* * * * *